United States Patent
Kota et al.

(10) Patent No.: US 7,384,016 B2
(45) Date of Patent: Jun. 10, 2008

(54) ADAPTIVE COMPLIANT WING AND ROTOR SYSTEM

(75) Inventors: Sridhar Kota, Ann Arbor, MI (US); Joel A. Hetrick, Ann Arbor, MI (US)

(73) Assignee: FlexSys, Inc., Ann Arbor, MI (US)

( * ) Notice: Subject to any disclaimer, the term of this patent is extended or adjusted under 35 U.S.C. 154(b) by 0 days.

(21) Appl. No.: 10/548,053

(22) PCT Filed: Mar. 3, 2004

(86) PCT No.: PCT/US2004/006876

§ 371 (c)(1),
(2), (4) Date: Sep. 2, 2005

(87) PCT Pub. No.: WO2004/108525

PCT Pub. Date: Dec. 16, 2004

(65) Prior Publication Data

US 2006/0186269 A1 Aug. 24, 2006

Related U.S. Application Data

(60) Provisional application No. 60/451,812, filed on Mar. 3, 2003.

(51) Int. Cl.
*B64C 3/48* (2006.01)
(52) U.S. Cl. ................... 244/123.1; 244/201
(58) Field of Classification Search ............. 244/123.1, 244/218, 219, 200, 213
See application file for complete search history.

(56) References Cited

U.S. PATENT DOCUMENTS

| | | | | |
|---|---|---|---|---|
| 1,856,578 A | * | 5/1932 | Miquel et al. | 244/219 |
| 2,517,509 A | * | 8/1950 | Sikorsky | 244/17.11 |
| 3,118,639 A | * | 1/1964 | Kiceniuk | 244/219 |
| 3,716,209 A | * | 2/1973 | Pierce | 244/123.1 |
| 3,930,626 A | * | 1/1976 | Croswell, Jr. | 244/219 |
| 4,067,518 A | * | 1/1978 | Paterson et al. | 244/130 |
| 4,235,397 A | * | 11/1980 | Compton | 244/12.5 |
| 4,261,534 A | * | 4/1981 | Roselli | 244/22 |
| 4,296,900 A | * | 10/1981 | Krall | 244/219 |
| 4,349,169 A | * | 9/1982 | McAnally | 244/219 |
| 4,351,502 A | * | 9/1982 | Statkus | 244/219 |
| 4,485,991 A | * | 12/1984 | Fuller | 244/49 |
| 4,865,275 A | * | 9/1989 | Thompson | 244/219 |
| 5,033,693 A | * | 7/1991 | Livingston et al. | 244/53 B |

(Continued)

*Primary Examiner*—Timothy D. Collins
(74) *Attorney, Agent, or Firm*—Rohm & Monsanto, PLC

(57) ABSTRACT

Variation in the contours of first and second compliant surfaces is produced by a compliant frame having a first resiliently variable frame element (120) having a corresponding first outer surface (122) and a first inner surface (124), and a second resiliently variable frame element (130) having a corresponding second outer surface (132) and a second inner surface (134). The first and second outer surfaces (122, 132) communicate with respective ones of the first and second compliant surfaces. A linkage element (141-144) having a predetermined resilience characteristic is coupled at a first end thereof to the first inner surface (124) and at a second end thereof to the second inner surface (134). A frame coupler (151) couples the first resiliently variable frame element (120) to a support element (150). An actuator (106) applies a force to the second resiliently variable frame element (130) with respect to the support element (150), resulting in a corresponding variation in the contour of the first and second compliant surfaces.

23 Claims, 22 Drawing Sheets

U.S. PATENT DOCUMENTS

| | | | |
|---|---|---|---|
| 5,150,864 A * | 9/1992 | Roglin et al. | 244/219 |
| 5,367,970 A * | 11/1994 | Beauchamp et al. | 114/140 |
| 5,662,294 A * | 9/1997 | Maclean et al. | 244/219 |
| 5,681,014 A * | 10/1997 | Palmer | 244/219 |
| 5,794,893 A * | 8/1998 | Diller et al. | 246/213 |
| 5,810,291 A * | 9/1998 | Geiger et al. | 244/133 |
| 5,887,828 A * | 3/1999 | Appa | 244/215 |
| 5,971,328 A * | 10/1999 | Kota | 244/219 |
| 6,045,096 A * | 4/2000 | Rinn et al. | 244/219 |
| 6,068,219 A * | 5/2000 | Arata | 244/219 |
| 6,076,775 A * | 6/2000 | Bauer | 244/212 |
| 6,152,405 A * | 11/2000 | Muller | 244/219 |
| 6,164,598 A * | 12/2000 | Young et al. | 244/212 |
| 6,173,925 B1 * | 1/2001 | Mueller et al. | 244/219 |
| 6,182,929 B1 * | 2/2001 | Martin et al. | 244/219 |
| 6,276,641 B1 * | 8/2001 | Gruenewald et al. | 244/213 |
| 6,644,599 B2 * | 11/2003 | Perez | 244/219 |
| 6,816,823 B2 * | 11/2004 | Becker | 703/8 |
| 2005/0274847 A1 * | 12/2005 | Charron | 244/123.1 |
| 2006/0118675 A1 * | 6/2006 | Tidwell | 244/123.1 |

* cited by examiner

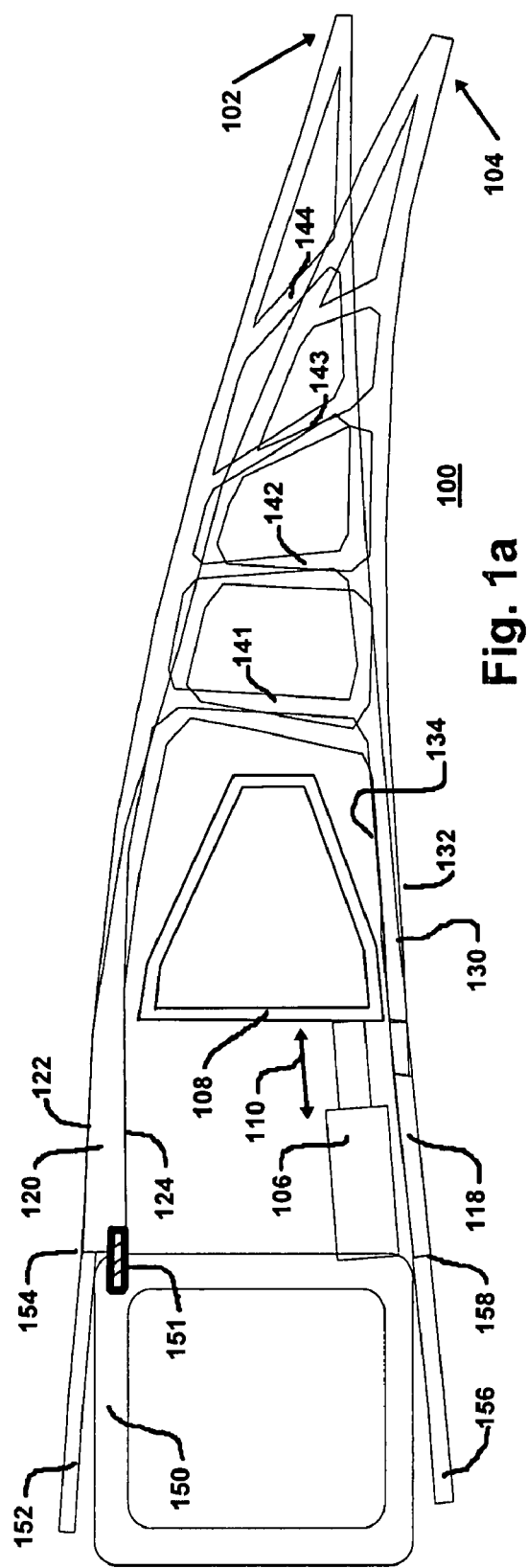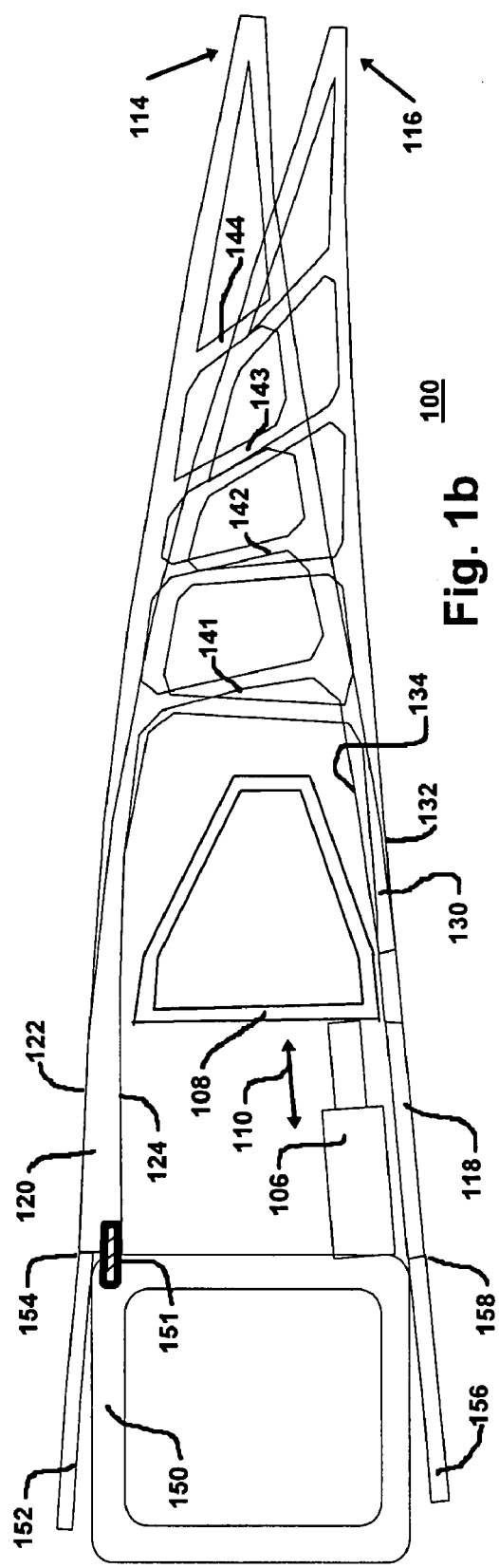

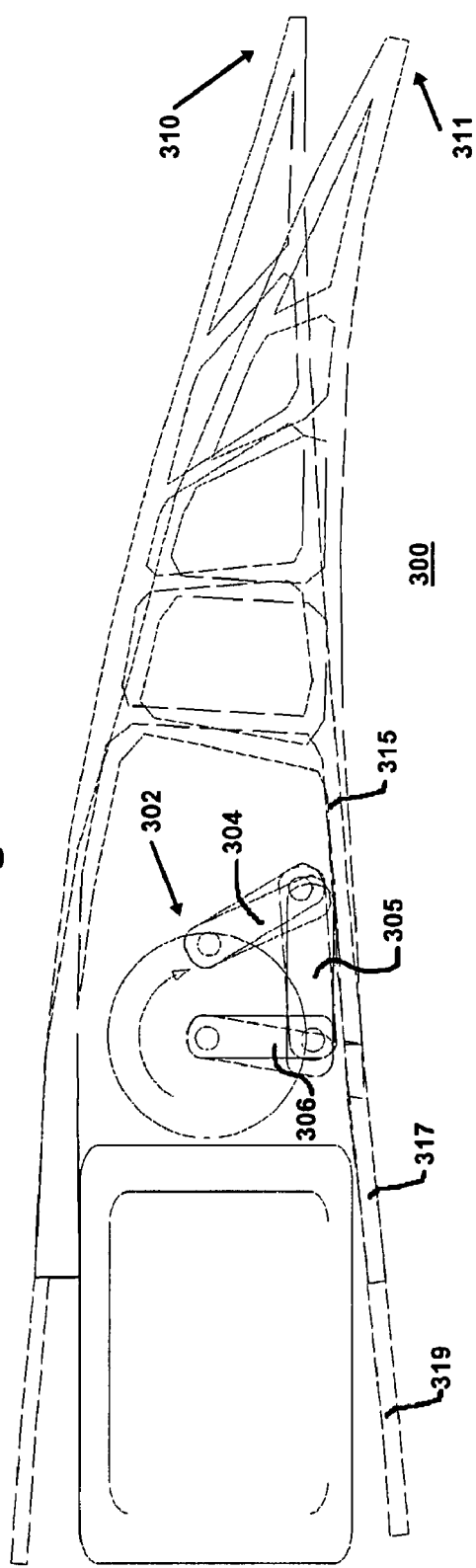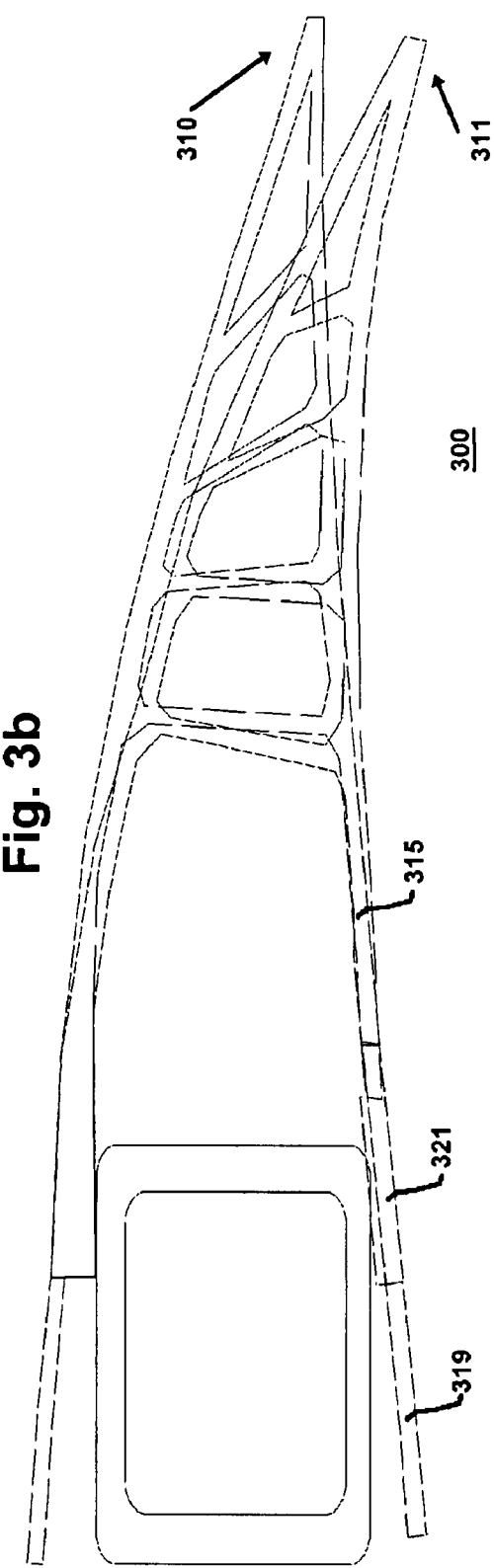

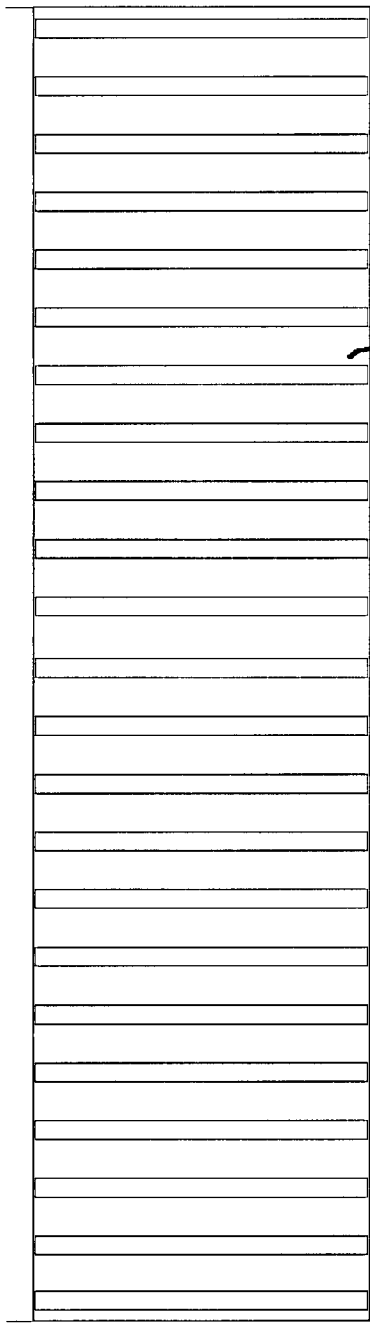
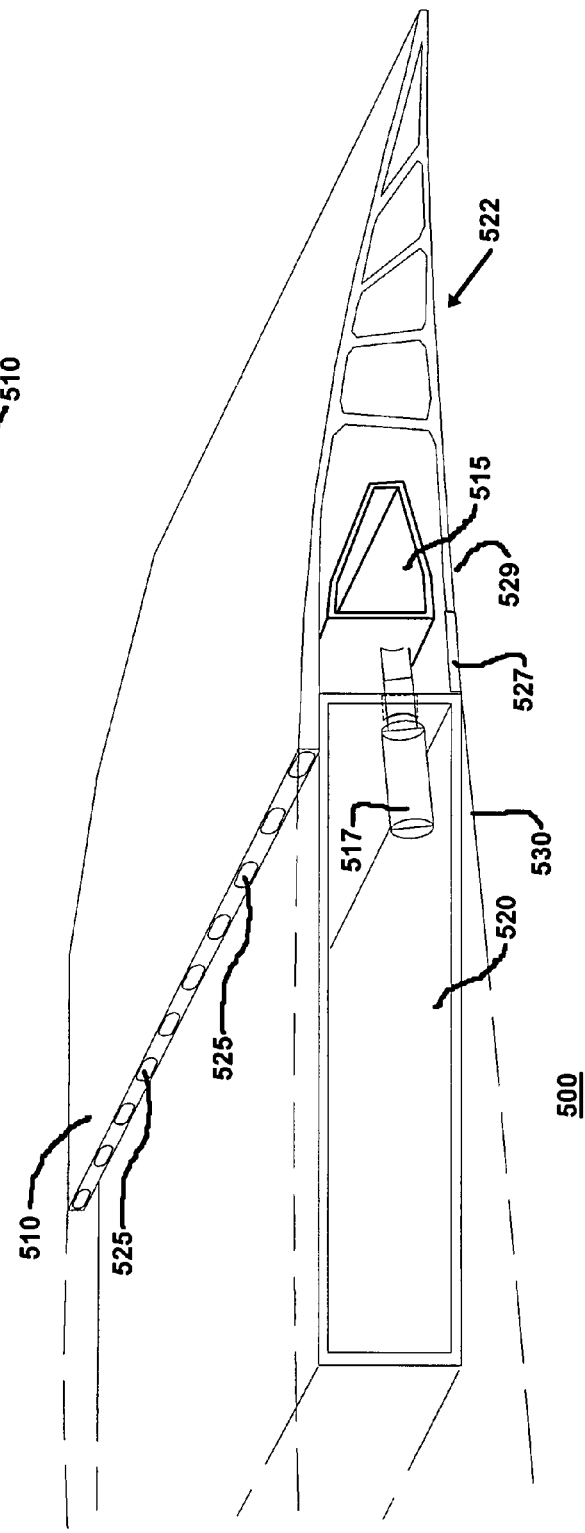

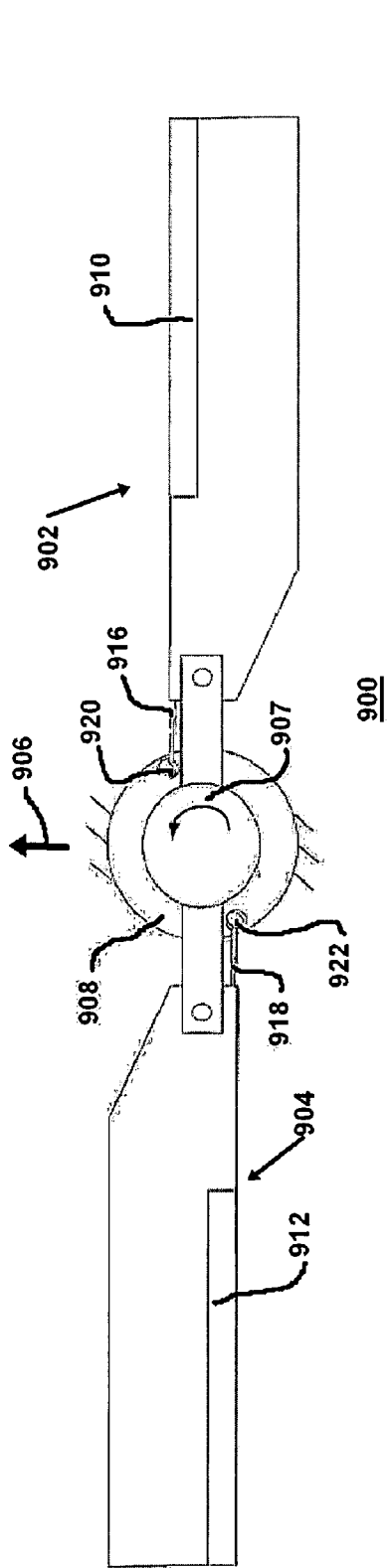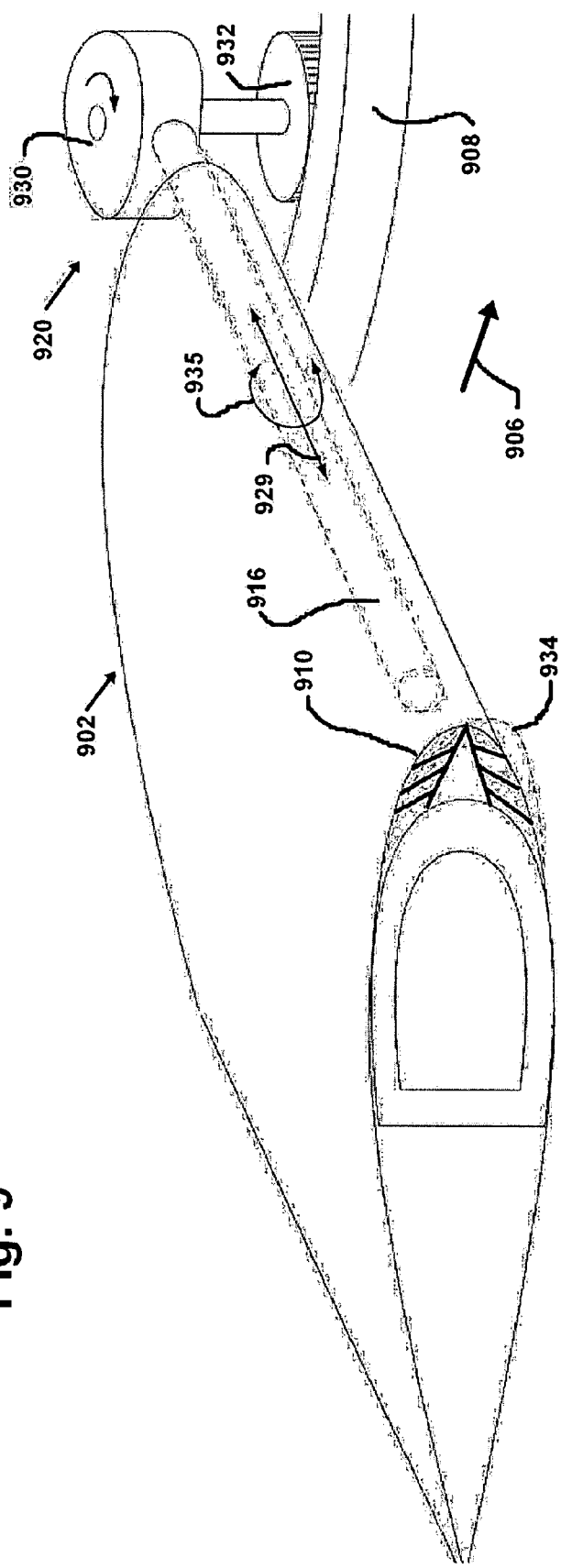
Fig. 9
Fig. 10

2200

2200

2200

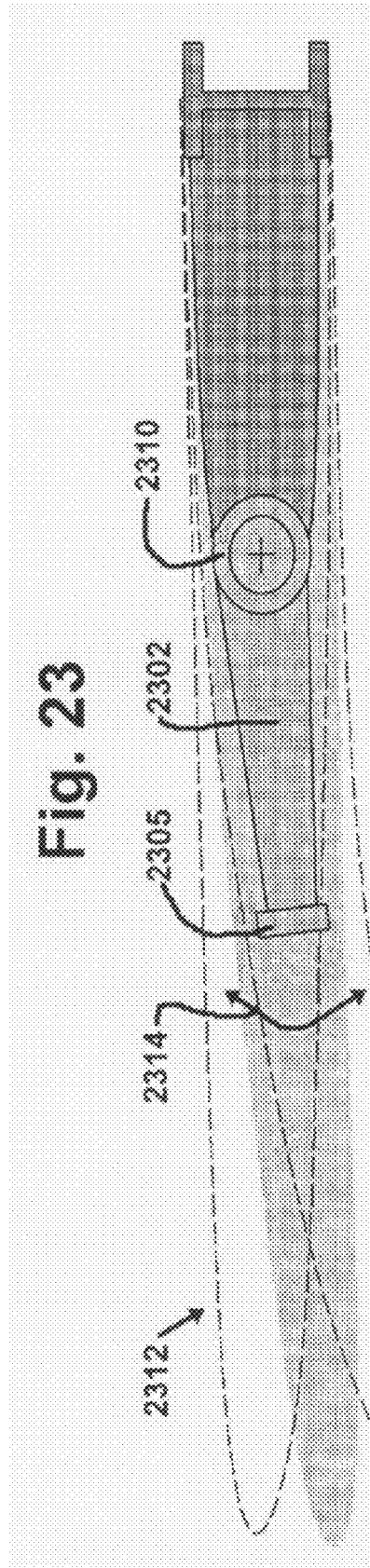
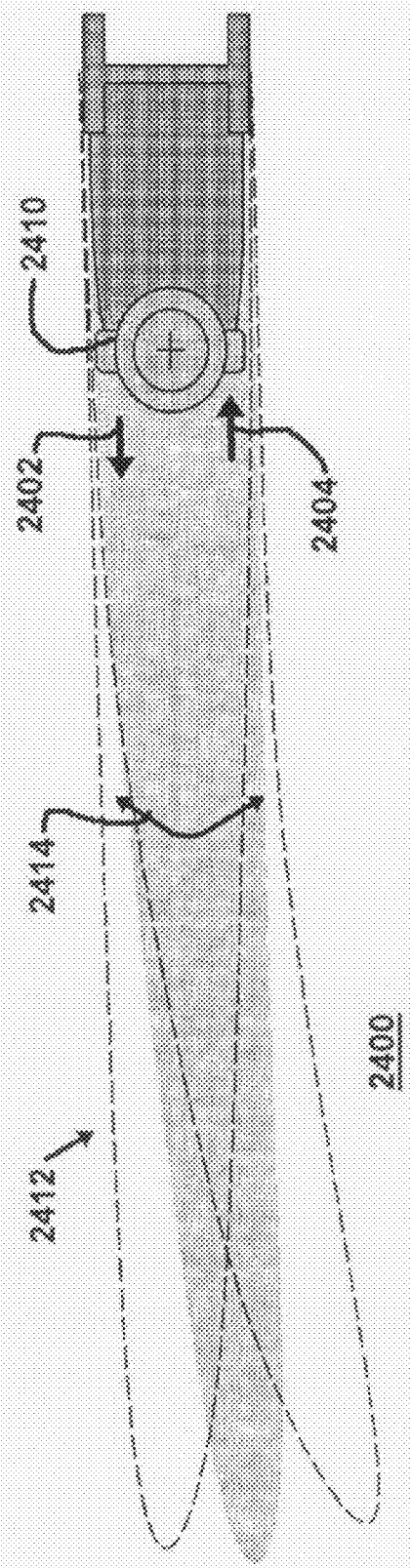

ial Patent Application Ser. No. 60/451,812 filed Mar. 3, 2003, the disclosure of which is incorporated herein by reference.

ADAPTIVE COMPLIANT WING AND ROTOR SYSTEM

RELATIONSHIP TO OTHER APPLICATION

This application claims the benefit of U.S. Provisional Patent Application Ser. No. 60/451,812 filed Mar. 3, 2003, the disclosure of which is incorporated herein by reference.

GOVERNMENT RIGHTS

This invention was made in part under contract, awarded under SBIR Contract No. F33615-01-C-3100 Air Force Research Lab, Air Vehicles Directorate. The government has certain rights in the invention.

BACKGROUND OF THE INVENTION

1. Field of the Invention

This invention relates generally to systems for producing adaptive compliant surface contours, such as for wings, rotor blades, and control and other surfaces for aircraft, surface and submersible water craft, and the like, and more particularly, to a system that produces a variable surface contour of fixed and rotary control surfaces.

2. Description of the Related Art

A need for surfaces having an adjustable or variable contour is present in a wide variety of applications, ranging from aircraft and water craft control surfaces to specialized furniture. Absent the ability to vary the surface contour in any such application results in the creation of products and systems that are not optimally designed, but instead are configured as compromises between conflicting design goals. In the case of airfoils for aircraft, it is known that overall drag results from the combination of friction between the airfoil and the air flowing therearound, and the lift component of force supplied to an aircraft wing. In such an application, innumerable variations can be effected between airfoil thickness, airfoil camber, airfoil length and width, and the like. The conventional airfoil, therefore, is but the implementation of an engineering compromise to effect an acceptable lift:drag ratio, which is a primary flight control parameter. There is a need, therefore, for an arrangement that enables advantageous variation in the shape of an airfoil and the contour of the associated control surfaces.

There is a need for an arrangement for varying the dimensions and contours of airfoils, such as aircraft wings, so as to optimize same for different flight conditions Thus, for example, the wing configuration that would be optimum for stable, undisturbed flight, would be different from the wing configuration that would be optimized during take-off and landing. It would additionally be advantageous if the contour of the airfoil is adjusted in a manner that is not constant throughout the length of the airfoil, but which varies, illustratively to form a twist along the control surface of the wing. There is a need for optimizing the configuration and contour of such surfaces in other applications, such as in hydrofoils for water craft and spoilers for high speed land vehicles.

In addition to the foregoing, there is a need for a system that affords advantageous variation of a surface contour for applications unrelated to airfoils, hydrofoils, spoilers, and the like. Such other applications may include, for example, adjustable seating surfaces, including back supports as well as fluid passageways, the dimensions of which are desired to be varied, such as an air intake passageway for an engine of a vehicle.

It is, therefore, an object of this invention to provide a simple and economical arrangement for varying a contour of a surface.

It is another object of this invention to provide an adjustable control surface for a fixed wing of an aircraft.

It is another object of this invention to provide an adjustable control surface for a rotary wing of an aircraft or the propeller of a submarine.

It is also an object of this invention to provide an airfoil having an adjustable configuration.

It is a further object of this invention to provide an aircraft wing arrangement that can be optimized for various flight conditions.

It is additionally an object of this invention to provide a hydrofoil having an adjustable surface contour for a control surface.

It is also another object of this invention to provide a variable control surface for a spoiler for use in a land vehicle.

It is also another object of this invention to provide a fluid passageway having a variable contour.

It is yet an additional object of this invention to provide a variable surface for a seating arrangement.

SUMMARY OF THE INVENTION

The foregoing and other objects are achieved by this invention which provides compliant mechanisms and actuation arrangements for achieving advantageous variations in surface contours that control and propel aircraft and water craft.

In accordance with the invention, there is provided an arrangement for producing a variation in the contour of a compliant surface. The arrangement is provided with a compliant frame having a first resiliently variable frame element having a corresponding first outer surface and a first inner surface, and a second resiliently variable frame element having a corresponding second outer surface and a second inner surface. The first outer surface is arranged in substantially distal opposition to the second outer surface and in communication with the compliant surface. Thus, the variation in the contour of the compliant surface is responsive to variation in the contour of the first outer surface of the compliant frame in addition, there is provided a linkage element having a predetermined resilience characteristic. The linkage arrangement is coupled at a first end thereof to the first inner surface and at a second end thereof to the second inner surface. An actuator applies a force to the second resiliently variable frame element with respect to a support element, resulting in a corresponding variation in the contour of the compliant surface.

In one embodiment of the invention, there is further provided a frame coupler for coupling the first resiliently variable frame element to a support element.

In other embodiments, there is further provided a second linkage element formed of a first material having a second predetermined resilience characteristic. The second linkage element is coupled at a first end thereof to the first inner surface and at a second end thereof to the second inner surface. The first and second linkage elements are formed of materials that have substantially identical resilience characteristics. In a practical embodiment, the first and second linkage elements are longitudinal in configuration and are arranged substantially parallel to each other.

In further embodiments, the first and second resiliently variable frame elements are coupled to each other at a portion thereof distal from the support element. The support element is, in some embodiments, a spar of a wing of an aircraft. The resiliently variable frame elements have respective first and second resilience characteristics.

The actuator is arranged, in some embodiments, to exert a substantially longitudinal force. In other embodiments, the actuator is arranged to exert a torque, and is arranged to convert the torque to a substantially longitudinal force.

Some of the potential uses of the invention include arrangements wherein:

the compliant surfaces is a surface of a wing of a fixed wing aircraft;

the compliant surface is a surface of a rotary wing of a helicopter;

the compliant surface is a surface of an impeller of a water craft; and the compliant surface is a surface of a keel of a water craft.

In accordance with a further apparatus aspect of the invention, there is provided an arrangement for producing a variation in the contours of a first compliant surface. The arrangement is provided with a first compliant frame having a respective first resiliently variable frame element having a corresponding first outer surface and a first inner surface, and a respective second resiliently variable frame element having a corresponding second outer surface and a second inner surface. The respective first and second outer surfaces are arranged in substantially distal opposition to one another and in communication with respectively associated ones of the first and second compliant surfaces. In this manner, the variation in the contours of the first and second compliant surfaces are responsive to variation in the contours of the first and second outer surfaces of the first compliant frame. There is additionally provided a second compliant frame having a respective first resiliently variable frame element having a corresponding first outer surface and a first inner surface, and a respective second resiliently variable frame element having a corresponding second outer surface and a second inner surface. The respective first and second outer surfaces are arranged in substantially distal opposition to one another and in communication with respectively associated ones of the first and second compliant surfaces. Thus, the variation in the contours of the first and second compliant surfaces are responsive to variation in the contours of the first and second outer surfaces of the second compliant frame. There is additionally provided a first linkage element having a predetermined resilience characteristic. The first linkage element is coupled at a first end thereof to the first inner surface and at a second end thereof to the second inner surface, of the first compliant frame. A second linkage element having a predetermined resilience characteristic is coupled at a first end thereof to the first inner surface and at a second end thereof to the second inner surface, of the second compliant frame. Also, a first frame coupler is provided for coupling the first resiliently variable frame element of the first compliant frame to a support element, and a second frame coupler couples the first resiliently variable frame element of the second compliant frame to a support element. A drive element is coupled to the second resiliently variable frame element of each of the first and second compliant frames. Additionally, an actuator is employed to apply a force to the drive element with respect to the support element. Upon the application of the force by the actuator, a corresponding variation in the contour of the first compliant surfaces of the first and second compliant frames is effected.

In one embodiment of this further apparatus aspect of the invention, the actuator includes a power take off arrangement associated with a rotary wing of a rotary wing aircraft. The power take off arrangement provides a force that varies in response to the angular position of the rotary wing.

In embodiments of the invention where the actuator is of a rotary type, the actuator converts the torque to a linear force. This is achieved in certain embodiments of the invention with the use of linkages.

The first and second compliant frames are arranged, in some embodiments, in side-by-side relation to each other. The first compliant surface is arranged to overlie the first outer surface of each of the first and second compliant frames. A resilient filler material is disposed intermediate of the first and second compliant frames. In further embodiments, there is provided a second compliant surface arranged to overlie the second outer surface of each of the first and second compliant frames.

Some embodiments of the invention orient the first and second compliant frames in mirror image relation to each other whereby the respective second resiliently variable frame elements of the first and second compliant frames communicate with each other.

In accordance with a still further aspect of the invention, there is provided an arrangement for producing a variation in the contours of first and second compliant surfaces. The arrangement is provided with a compliant frame having a first resiliently variable frame element having a corresponding first outer surface and a first inner surface, and a second resiliently variable frame element having a corresponding second outer surface and a second inner surface. The first and second outer surfaces are arranged in substantially distal opposition to one another and in communication with respectively associated ones of the first and second compliant surfaces. In this manner, the variation in the contours of the first and second compliant surfaces are responsive to variation in the contours of the first and second outer surfaces of the compliant frame. There is additionally provided a linkage element having a predetermined resilience characteristic and being coupled at a first end thereof to the first inner surface and at a second end thereof to the second inner surface. A frame coupler couples the first resiliently variable frame element to a support element. Additionally, an actuator applies a force to the second resiliently variable frame element with respect to the support element. The application of the force by the actuator results in a corresponding variation in the contour of the first and second compliant surfaces.

In certain embodiments of the invention, elastomeric or polymeric materials are used to accommodate displacement of surface elements that result from the relative motion that occurs as the contour is varied. In other embodiments, surface elements are configured to slide along one another. In still further embodiments, complementary compliant arrangements are provided, thereby precluding such displacement of surface elements.

In embodiments of the invention that have a longitudinal aspect, such as the leading or trailing edges of wings or rotors, a plurality of compliant mechanisms are sequentially arranged therealong. The space therebetween is, in certain embodiments, filled with material that is softer than the material from which the compliant mechanism is formed. For example, in certain embodiments the compliant mechanisms are formed of aerospace grade titanium alloy or aluminum 2024 or composites. Such compliant mechanisms are cut from stock material using electro discharge machining (EDM) technique or laser cutting. The softer material that is interposed between the compliant mechanisms may be, for example, an aluminum polycarbonate that is adapted to bond to the compliant mechanisms.

It is an aspect of the present invention that rotating wings, such as for helicopters, vary their contour throughout each cycle of rotation. Thus, in the case of a helicopter, the rotor blade will assume a first contour during the advancing portion of the cycle, and a second contour during the retreating portion of the cycle.

In embodiments of the invention that are used, for example, in connection with submarine propellers, the propeller blades can assume different contours during respective portions of the cycle of rotation. Thus, for example, if it is desired to turn the submarine toward starboard, the starboard half of the cycle of rotation is configured to provide less thrust than the port half of the cycle of rotation. Similarly, if it is desired to achieve a rapid descent, the top half of the cycle of rotation is configured to provide greater thrust than the lower half. The use of the present invention in connection with the maneuvering of a submarine therefore requires that the predetermined segment of the cycle of rotation throughout which the contour change is desired itself be angularly variable to enable multidimensional maneuverability.

BRIEF DESCRIPTION OF THE DRAWING

Comprehension of the invention is facilitated by reading the following detailed description, in conjunction with the annexed drawing, in which:

FIG. 1a is a simplified schematic representation of a compliant structure having a shape characteristic that is varied in response to a moving fluid, such as air or water, the compliant structure being shown in positive flap deflection and downwardly deformed conditions;

FIG. 1b is a simplified schematic representation of the compliant structure of FIG. 1a, the compliant structure being shown in negative flap deflection and nominal conditions;

FIG. 3a is a simplified schematic representation of a further embodiment of a compliant structure that is constructed to employ an actuator that is coupled to the compliant structure via linkages, shown in positive flap deflection and downwardly deformed conditions;

FIG. 3b is a simplified schematic representation of the further embodiment of FIG. 3a, the actuator not being shown herein, illustrated in positive flap deflection and downwardly deformed conditions;

FIG. 5a is a simplified schematic representation of a composite 3-dimensional arrangement of material that is useful in a further embodiment of a compliant structure;

FIG. 5b is a simplified schematic representation of a specific illustrative embodiment of the invention that is constructed to employ the composite 3-dimensional arrangement shown in FIG. 5a of stiffer compliant ribs and softer polymeric materials to achieve a predetermined blend of stiffness and flexibility;

FIG. 9 is a simplified schematic representation of an illustrative manner by which mechanical energy is drawn from the rotation of a helicopter rotary wing arrangement to effect a shape change in the rotor blade;

FIG. 10 is a simplified schematic representation of the rotor blade arrangement of FIG. 9 showing an illustrative arrangement by which leader edge camber change is effected;

FIG. 23 illustrates a compliant structure actuated by a lever arm;

FIG. 24 illustrates a compliant structure actuated by a torque tube;

DETAILED DESCRIPTION

Figure 2:
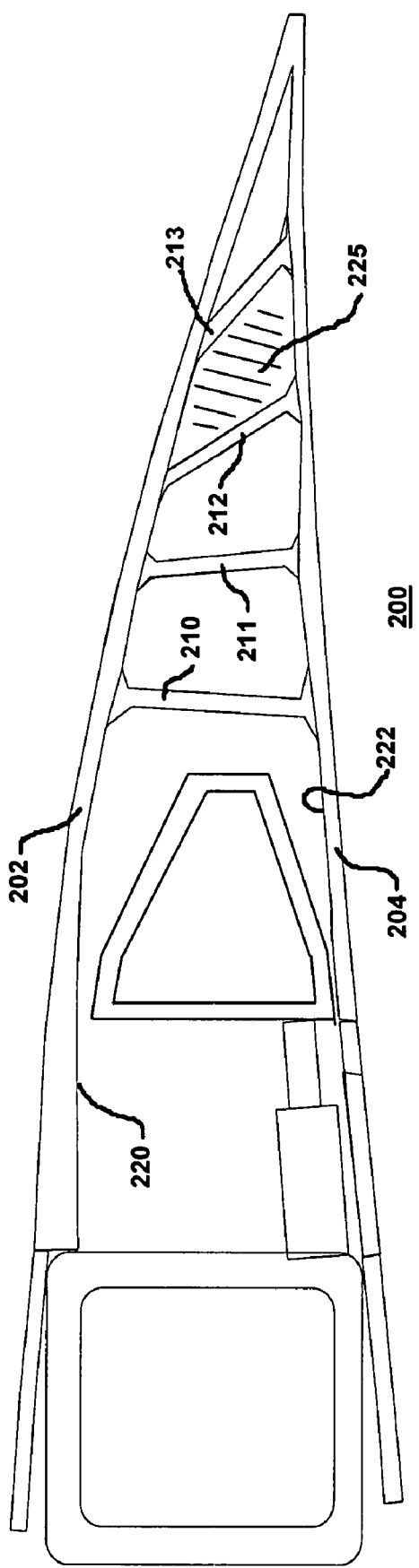
FIG. 2 is a simplified schematic representation of a further compliant structure that is formed of a plurality of materials and particular illustrative forms of materials that are combined to achieve advantageous functional and structural characteristics of the compliant structure.

FIG. 1a is a simplified schematic representation of a compliant structure 100 having a shape characteristic that is varied in response to a moving fluid, such as air or water (not shown). in the figure, the compliant structure being shown in a positive flap deflection condition at position 102 and in downwardly deformed condition at position 104. The positions are determined by operation of an actuator 106 that applies a linear force, in this specific illustrative embodiment of the invention, to a drive tube 108 in the direction of arrow 110. Drive tube 108 is shown cross-sectionally and arranged to extend in a direction substantially perpendicular to the plane of the figure.

FIG. 1b is a simplified schematic representation of compliant structure 100 of FIG. 1a, the compliant structure being shown in a negative flap deflection condition at position 114 and in a nominal condition at position 116. Elements of structure that bear analogous correspondence to those discussed in relation to other figures are similarly designated.

The embodiment of FIGS. 1a and 1b is a primary embodiment of a compliant structure that works to impart a sophisticated and continuous change of shape under the influence of one or more (continuous and/or discrete) actuators 106, and may include additional features such as an elastomeric panel 118 that accommodates expansion or contraction of surfaces while still providing rigidity to aero-hydro loads. Alternatively a sliding surface (not shown in this figure) may be applied in place of the elastomeric surface. In embodiments where discrete actuators are used for motion/force transfer to the compliant structure, drive tube 108 is utilized to apply continuous force/motion to the compliant structure along the length of the structure (span). This compliant surface may be activated when necessary to cause changes in the shape of an airfoil or hydrofoil. The changes are, in certain embodiment, subject to a control algorithm designed to affect lift, drag, pitch, stability, or some other characteristic of the device.

In the specific illustrative embodiment of FIGS. 1a and 1b, compliant structure 100 is in the form of a compliant frame having a first resiliently variable frame element 120 having a corresponding first outer surface 122 and a first inner surface 124. A second resiliently variable frame element 130 has a corresponding second outer surface 132 and a second inner surface 134. As shown, the first and second outer surfaces (122 and 132) being arranged in substantially distal opposition to one another and in communication with respectively associated ones of the first and second compliant surfaces. In this specific illustrative embodiment of the invention, the first and second outer surfaces also serve as the corresponding compliant surfaces. In other embodiments, however, the compliant surfaces constitute further structure that overlies the first and second outer surfaces. See, for example, FIG. 12. The contours of the first and second compliant surfaces are responsive to variation in the contours of the first and second outer surfaces of the compliant frame (i.e., compliant structure 100).

Compliant structure 100 is further shown in this figure to be provided with a plurality of linkage elements 141, 142, 143, and 144, which may be formed integrally with frame elements 120 and 130. The linkage elements couple frame elements 120 and 130 at their respective first and second inner surfaces 124 and 134. The linkage elements may be provided with respective resilience characteristics that are determined by the materials of which they are formed and their physical configurations, sizes, and orientations within compliant structure 100. In the present specific illustrative embodiment of the invention, the various linkage elements are shown to have generally elongated configurations, and are, but not necessarily, arranged substantially parallel to each another.

First resiliently variable frame element 120 is coupled by a frame coupler 151 to a support element 150, which in this embodiment is a rear wing spar of an aircraft (not shown). First resiliently variable frame element 120 is juxtaposed to the wing skin 152 to produce a smooth, uninterrupted interface at juncture 154. Similarly, elastomeric panel 118 is juxtaposed to the wing skin 156, to produce a smooth, uninterrupted interface at juncture 158. The second resiliently variable frame element 130 is coupled, in this embodiment, to drive tube 108 and receives a force via actuator 106, the force being applied relative to support element 150 (i.e., the wing spar).

FIG. 2 is a is a simplified schematic representation of a further compliant structure 200 that is formed of a plurality of materials and particular illustrative forms of materials that are combined to achieve advantageous functional and structural characteristics of the compliant structure. As shown in this figure, resiliently variable frame elements 202 and 204 have bonded thereto linkage elements 210, 211, 212, and 213. The bonds are effected at the respective ends of the linkage elements to respective inner surfaces 220 and 222 of resiliently variable frame elements 202 and 204.

As previously noted, the response of compliant structure 200 can be customized by the selection of material and configuration of the linkage elements. The materials of which the linkage elements are formed, and the resilience characteristic of the materials, can differ from the material and resilience characteristic of the resiliently variable frame elements. In addition, a third material may advantageously be inserted between the linkage elements, such as a damping foam 225 which in this specific illustrative embodiment of the invention is inserted between linkage elements 212 and 213.

For present purposes, the term "material" refers to all homogeneous, nonhomogeneous, porous, honeycomb, and fiber composite construction materials. Each material may have differing characteristics such as modulus, strength, damping, etc., such that it is desirable to have specific sections of the compliant structure made from specific materials. These different materials combine to further improve the functionality stiffness, strength, dynamics, thermal capacity, etc. of the rib over a single-material configuration of the rib alone.

In a highly advantageous embodiment of the invention, the resiliently variable frame elements 202 and 204, and the linkage elements, are formed of aerospace grade aluminum. The damping foam 225 may be a polymer and that is softer than the aerospace grade aluminum and is bonded to the aerospace grade aluminum. In yet further embodiments of the invention, the linkage elements are formed of a polymer that, in some embodiments, is harder than the damping foam and softer than the aerospace grade aluminum.

FIG. 3a is a simplified schematic representation of a further embodiment of the invention in the form of a compliant structure 300 that is constructed to employ a rotary actuator 302 that is coupled to the compliant structure via links 304, 305, and 306. Compliant structure 300 is shown in positive flap deflection condition at position 310 and in a downwardly deformed condition at position 311.

In this embodiment, a lower resiliently variable frame element 315 interfaces with an elastomeric panel 317 to form a smooth continuous surface with wing skin 319. The elastomeric panel functions to accommodate expansion or contraction of the surfaces while still providing rigidity to aero-hydro loads.

FIG. 3b is a simplified schematic representation of the further embodiment of FIG. 3a, the actuator not being shown herein. In this figure, compliant structure 300 is shown in positive flap deflection condition at position 310 and in a downwardly deformed condition at position 311, as was the case in the representation of FIG. 3a. However, the surface between lower resiliently variable frame element 315 and wing skin 319 is occupied in this embodiment by a smart media panel 321 that distributes the effect of actuation.

When necessary to enhance performance, linkages, gear trains, cams, or other mechanical devices including smart materials may be employed to generate a combination of linear and rotational forces/motions (with linear and non-linear relationships) to generate proper motion input for the compliant structure. These actuation methods may be applied discretely, at specific locations, or continuously across the span of the compliant structure. For discrete methods, the presence of a coupling member termed a drive tube (not shown in this figure), as previously described, is desirable to transfer the forces and motions of one or more actuators to the plurality of compliant ribs across the span.

Figure 4:
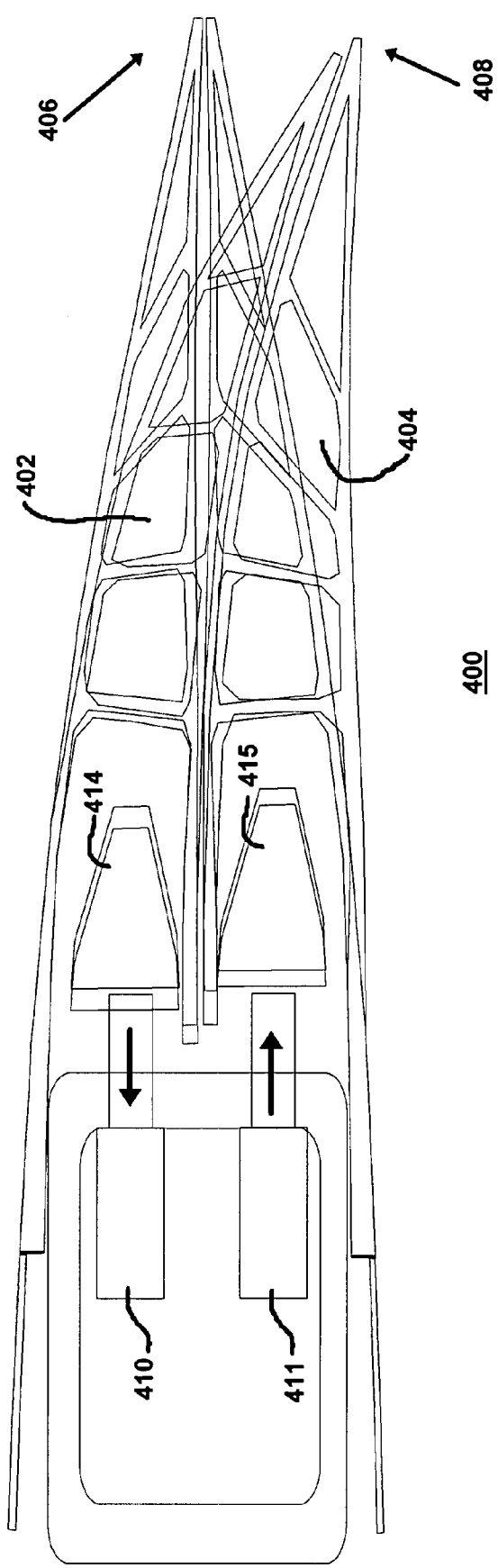
FIG. 4 is a simplified schematic representation of a further embodiment of a compliant structure that is constructed to employ a dual flap arrangement that avoids the need to use elastomeric sealing arrangements or sliding surfaces, the compliant structure being illustrated in nominal and downwardly deformed conditions.

FIG. 4 is a simplified schematic representation of a compliant structure 400 that is constructed to employ a dual flap arrangement, having compliant structures 402 and 404, that avoids the need to use elastomeric sealing arrangements or sliding surfaces. The compliant structure is illustrated in a nominal condition at position 406 and in a downwardly deformed condition at position 408. The dual flap configuration is utilized to avoid the use of an elastomeric seal or sliding surfaces along the mid chord of an airfoil/hydrofoil at transonic, supersonic, or hypersonic speeds. Here the two compliant structures 402 and 404 operate in unison in a push pull configuration actuated by actuators 410 and 411 that apply force to respective ones of drive tubes 414 and 415 to produce deflection of the control surface as a whole. Alternatively, the one of the surfaces could be deflected while the other remains fixed in a static position in a split flap arrangement. This configuration would primarily be used on a trailing edge flap or control surface where the split (sliding) surface would minimally effect the flow characteristics.

FIG. 5a is a simplified schematic representation of a composite 3-dimensional arrangement of material 510 that is useful in the embodiment of FIG. 5b. FIG. 5b is a simplified schematic representation of a specific illustrative embodiment of the invention in the form of foil 500 that is constructed to employ the composite 3-dimensional arrangement of material 510 shown in FIG. 5a having stiffer compliant ribs and softer polymeric materials to achieve a predetermined blend of stiffness and flexibility to change shape, bend, and move with the wing under aerodynamic loading (i.e., wing flex).

For discrete actuator arrangements, a drive tube 515 is utilized, as previously discussed, to provide a continuous actuator motion from discrete actuation sources, such as actuator 517. Actuator 517 applied a force to drive tube 515 against a wing box 520. Material 510 is arranged to overlie compliant structure 522 and wing box 520. In some embodiments of the invention, the regions 525 of material 510 are filled with relatively soft polymeric material (not specifically designated). Not all of the regions 525 need to be filled with the same relatively soft polymeric material, as it may in certain embodiments be desirable to achieve a gradient of resilience characteristic. In this embodiment, and elastomeric surface 527 bridges the spacing between the lower surface 529 of compliant structure 522 and wing skin 530, as previously discussed.

Figure 6A:
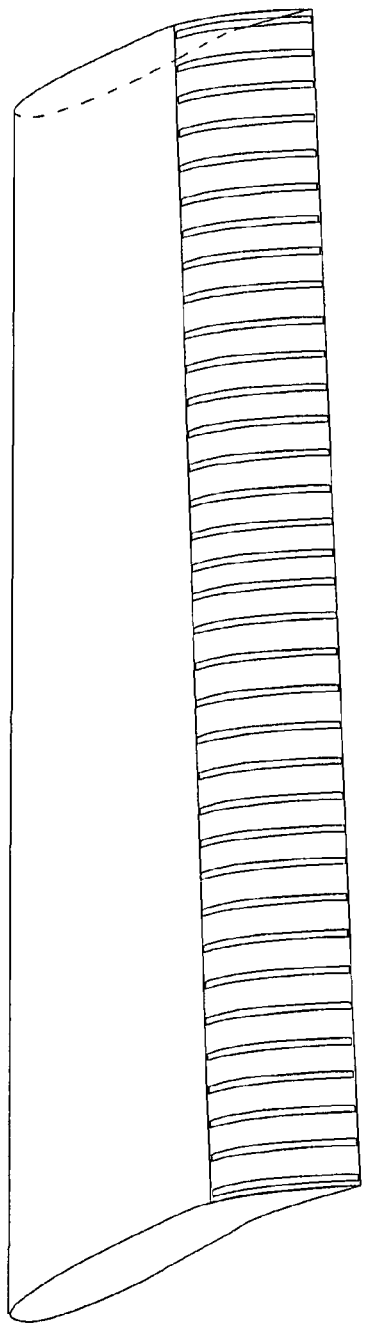
FIGS. 6a and 6b are simplified schematic representations that illustrate a wing in a nominal condition (FIG. 6a) and the same wing being flexed and with twisted control surfaces (FIG. 6b)
Figure 6B:
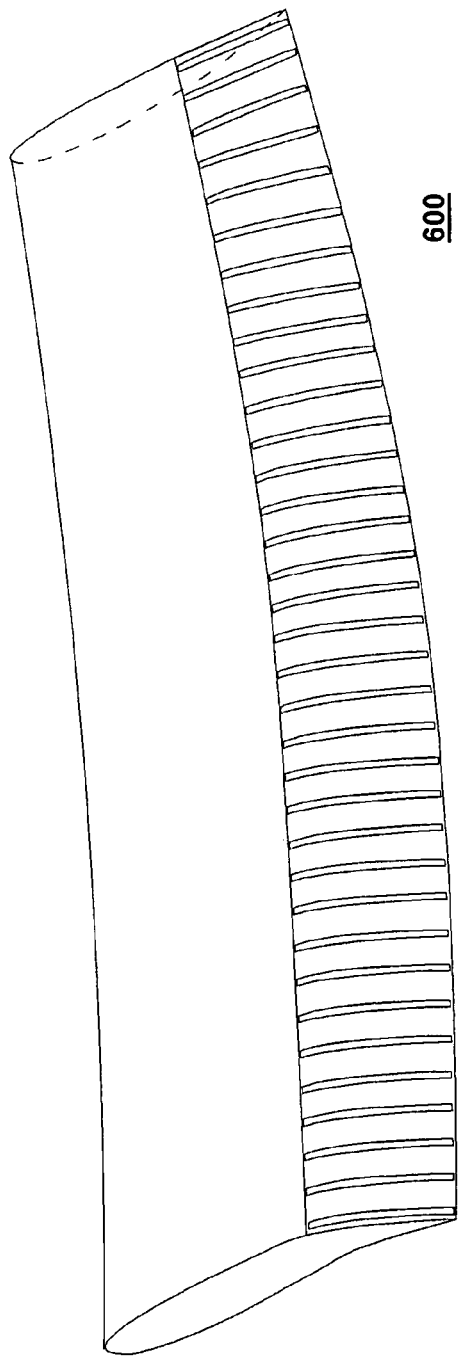

FIGS. 6a and 6b are simplified schematic representations that illustrate a wing 600 in a nominal condition (FIG. 6a) and the same wing being flexed and with twisted control surfaces (FIG. 6b). Wing flex along with twist of the control surface creates both shear and bending strains (against the major axis of the flap). These strains reduce the service life and load capacity of the compliant structure, and can be alleviated by utilizing a relatively soft polymeric or elastomeric material between the compliant ribs, as discussed above in connection with FIGS. 5a and 5b. This softer material serves to create a sealed aerodynamic surface while accommodating bending and shear strains due to twist of the control surface and flex of the wing. In an embodiment of the invention where wing 600 constitutes a trailing edge flap, the twist along the span of the trailing edge seen in FIG. 6b will range ±10° thereacross, with resulting expansion between ribs.

Figure 7:
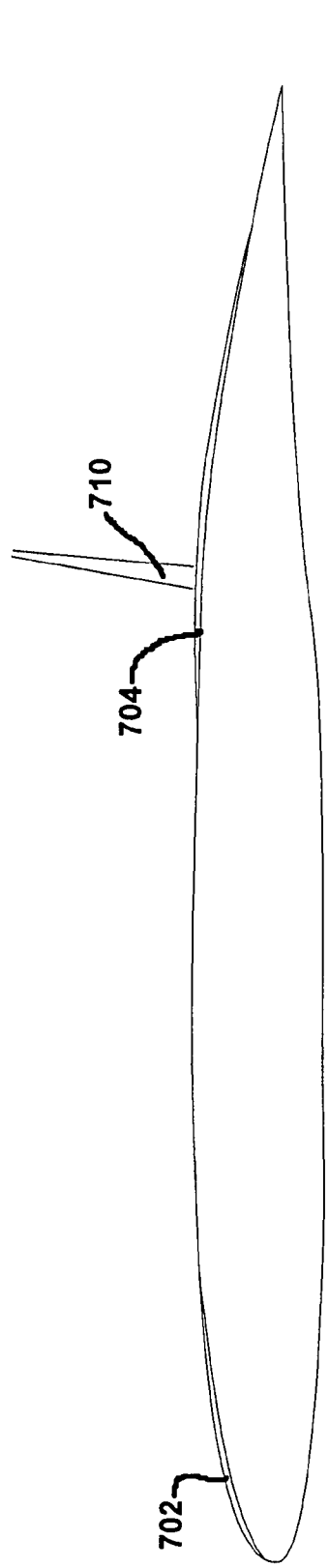
FIG. 7 is a simplified schematic representation of the use of compliant structures to effect specialized characteristics of fluid flow.

FIG. 7 is a simplified schematic representation of an airfoil 700 that uses compliant structures as described herein to effect specialized characteristics of fluid flow. In this embodiment, surface bumps 702 and 704 are formed by actuation of resilient elements. The bumps, particularly bump 704, serve to attenuate or to dampen a shock wave 710, or to effect advantageous placement of the shock wave on the airfoil.

Figure 8:
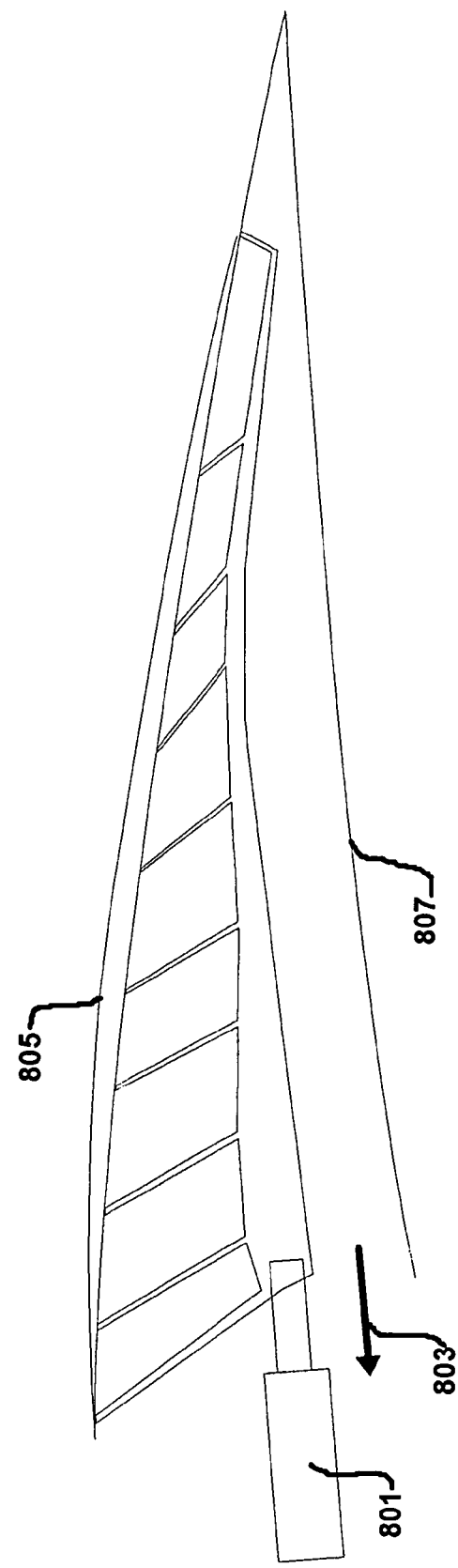
FIG. 8 is a simplified schematic representation of an illustrative compliant structure that may be used to effect specialized characteristics of fluid flow of FIG. 7.

FIG. 8 is a simplified schematic representation of an illustrative compliant structure that may be used to effect the specialized characteristics of fluid flow discussed in connection with FIG. 7. As shown in FIG. 8, the application of an input force by actuator 801 in the direction of arrow 803 results in a shape change in the form of a bump at position 805. In this specific illustrative embodiment of the invention, the lower skin 807 of the airfoil is not significantly affected. In addition to camber control and nose blunting, compliant structures can be utilized to effect additional characteristics of fluid flow including super sonic and hypersonic phenomenon such as the formation of shockwaves, laminar, turbulent and/or separated flow, compressibility effects, and other aerodynamic and aero-acoustic phenomenon.

FIG. 9 is a simplified schematic representation of an illustrative manner by which mechanical energy is drawn from the rotation of a helicopter rotary wing arrangement 900 to effect a shape change in the advancing rotor blade 902 and in the retreating rotor blade 904, employed in a rotary wing aircraft (not shown) traveling in the direction of arrow 906. The rotary blades extend from a hub 907 that contains a swash plate mechanism (not shown), and a fixed ring gear 908. Each of the rotor blades has an associated one of compliant leading edges 910 and 912. As will be discussed in greater detail below, each of the compliant leading edges 910 and 912 has associated therewith a corresponding one of drive shafts 916 and 918, each of which is coupled to an associated rotating gear/eccentric cam arrangement 920 and 922.

FIG. 10 is a simplified schematic representation of a portion of the helicopter rotary wing arrangement 900 of FIG. 9 showing an illustrative arrangement by which leader edge camber change is effected. Elements of structure that have previously been discussed are similarly designated. As shown in FIG. 10, rotating gear/eccentric cam arrangement 920 causes drive shaft 916 to be urged in the directions of two-headed arrow 929 by operation of eccentric cam 930 that is rotated by the engagement of gear 932 with fixed ring gear 908. Thus, the variation in the contour of advancing rotor blade 902, to achieve, for example, the change in camber contour at position 934, is a function of the angular position of the advancing rotor blade with respect to the fixed ring gear. In other embodiments of the invention, drive shaft 916 is caused to be rotated cyclically in the direction of two headed arrow 935.

These drawings depict the process of tapping power from the relativistic motion of the rotating rotor-blade shaft to the non-rotating helicopter body. In this specific illustrative embodiment of the invention, this is accomplished by utilizing a cam, gearing, linkage, or other mechanized assembly. The output of this mechanism would be a linear or rotary motion (timing might correspond to a fixed event). This motion (input power) is, in a specific illustrative embodiment of the invention, transmitted by a shaft running along the interior of the rotor-blade to a compliant mechanism (leading, trailing edge, etc.). Upon the application of input motion, the compliant mechanism would undergo a prescribed shape change to enhance the performance characteristics of the rotating blade aircraft. Specifically, in this embodiment, leading edge camber change (retreating blade) could delay the onset of wing stall and could increase lift capacity and maximum vehicle speed.

Figure 11:
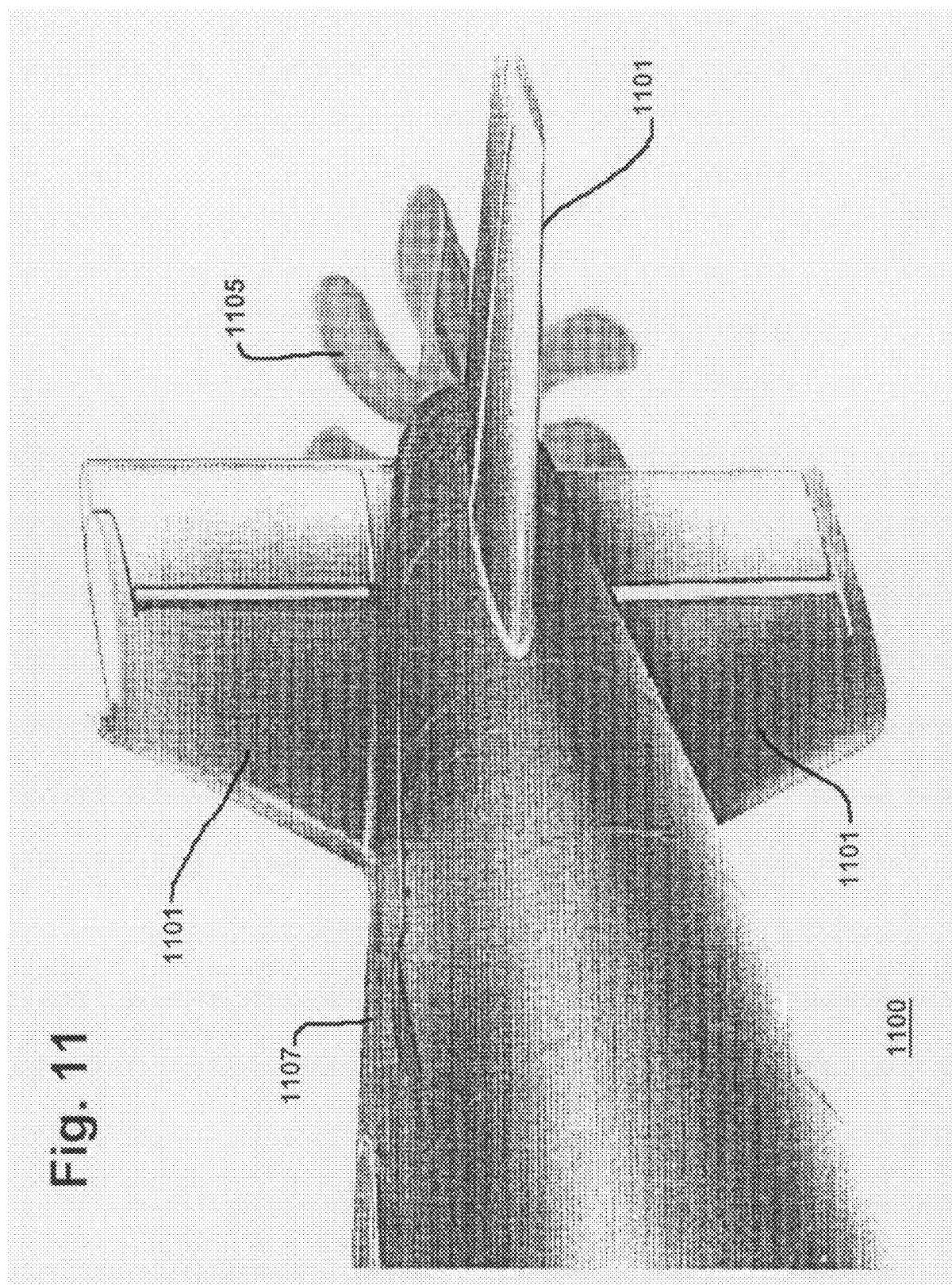
FIG. 11 is a perspective representation of certain fins and a propeller of a submarine that are configurable in accordance with the principles of the present invention.

FIG. 11 is a perspective representation of certain fins 1101 and a propeller 1105 of a submarine 1100 that are configurable in accordance with the principles of the present invention. Moreover, the main body 1107 of submarine 1100 can be configured in accordance with the principles of the invention to achieve optimized or otherwise desired hydrodynamic characteristics.

The design tools and compliant structures fabrication techniques that are currently being applied on cutting edge aircraft projects are directly applicable to hydrodynamic surfaces. Reshaping the leading edge on a hydroplane can produce similar drag reduction results, as a function of speed, as has been demonstrated on air vehicles. Also, hydro-surface camber changing, using variable geometry leading and trailing edge compliant surfaces, can produce lifting/control forces, in the appropriate direction, without the separated flow (high drag) regions produced with a conventional hinged flap.

In addition, submarine propeller contours can be varied between high performance and stealth modes of operation. It is additionally to be noted, as will further be discussed in regard of FIGS. 9, 10, 26, and 26 (helicopter rotor), that the contour of propeller 1105 can be varied so as not to be uniform throughout the 360° rotation, to promote improved the vessel's turning radius, rates of dive and ascent, and overall maneuverability. In such an embodiment, the angular region of camber displacement throughout the rotation of the propeller would itself be angularly varied depending upon the desired maneuver to be performed (i.e., turn left, turn right, dive, surface, etc.).

With respect to surface water craft (not shown), for example, it a high performance sailboat keel, employing camber changing variable geometry compliant structures, can sail more directly into the wind (beating) at a higher forward velocity, without the performance robbing heeling that is present with a conventional keel. The underwater surfaces on a high performance sailboat are much smaller than the aerodynamic surfaces (sails). However, because of the density difference between water and air, the force generation leverage of a variable camber hydrodynamic surface is much greater. Therefore, small changes in hydrodynamic surface camber generate large restoring moments to counteract the sail side force component preventing sideways movement or leeway.

Figure 12:
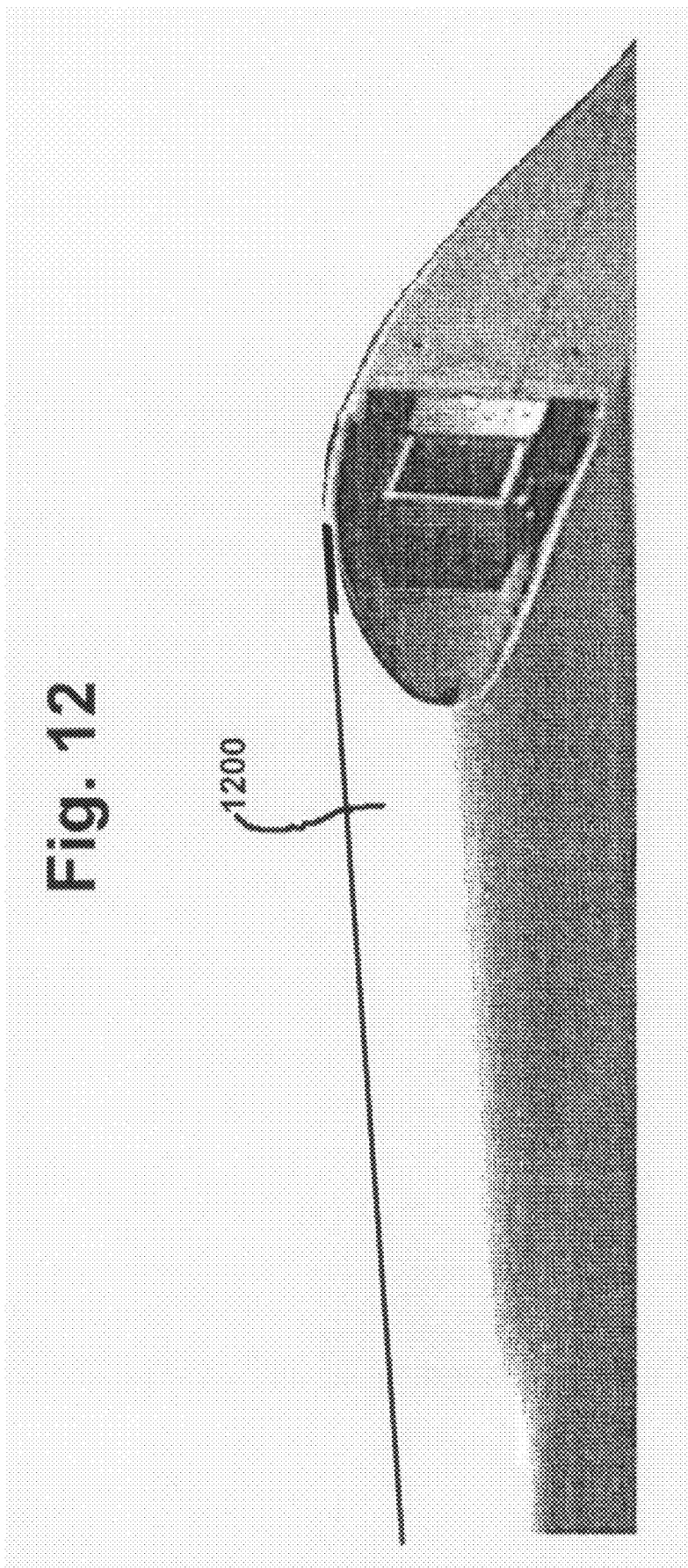
FIG. 12 is a perspective representation of a prototypical wing portion constructed in accordance with the principles of the invention, and shown to be under test conditions.

FIG. 12 is a perspective representation of a prototypical wing portion 1200 constructed in accordance with the principles of the invention, and shown to be under wind tunnel test conditions. The wing portion shown in this figure achieves a 6° leading edge camber, which corresponds to a 25% increase in lift coefficient. As noted, the airfoil of the present invention yields high lift for rotor craft. The invention is applicable to effect variation in camber and/or shape of an airfoil.

Figure 13:
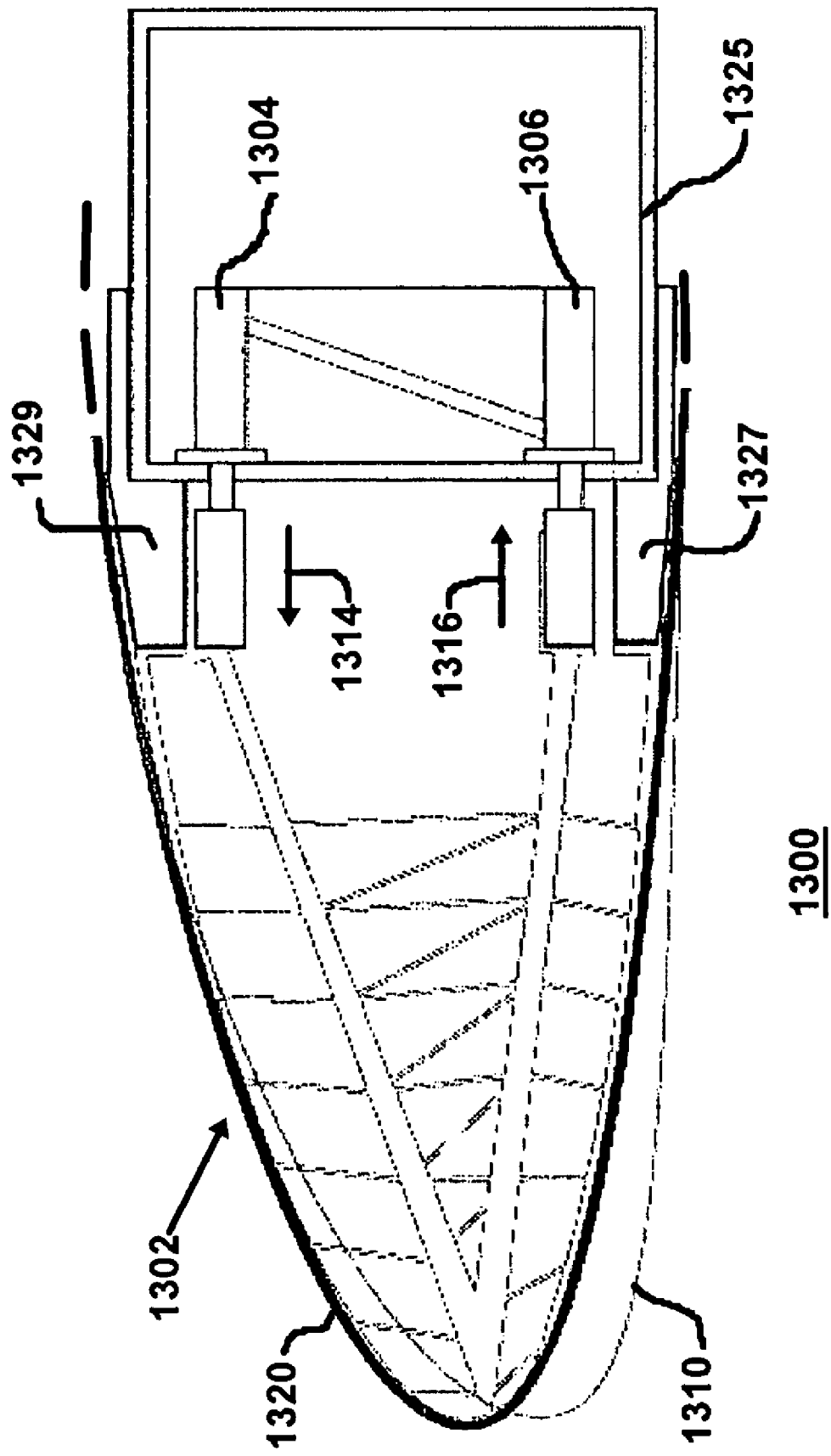
FIG. 13 is a simplified schematic representation that illustrates the operation of a prototype that produces the noted 6° camber change.

FIG. 13 is a simplified schematic representation that illustrates the operation of a compliant system 1300 that produces the noted 6° camber change. There is represented in the figure a compliant mechanism 1302 that is acted upon, in this specific illustrative embodiment of the invention, by a pair of actuators 1304 and 1306 that will urge the arrangement between the nominal position and the contour indicated as the resulting shape change 1310.

Compliant system 1300 achieves resulting shape change 1310 by actuation of actuators 1304 and 1306 in the directions of arrows 1314 and 1316. In this embodiment, compliant mechanism 1302 is covered by a wing skin 1320 that adapts to the contour of the compliant mechanism. In this embodiment, compliant system 1300 is coupled to a main spar 1325 by operation of compliant mounts 1327 and 1329.

Figure 14:
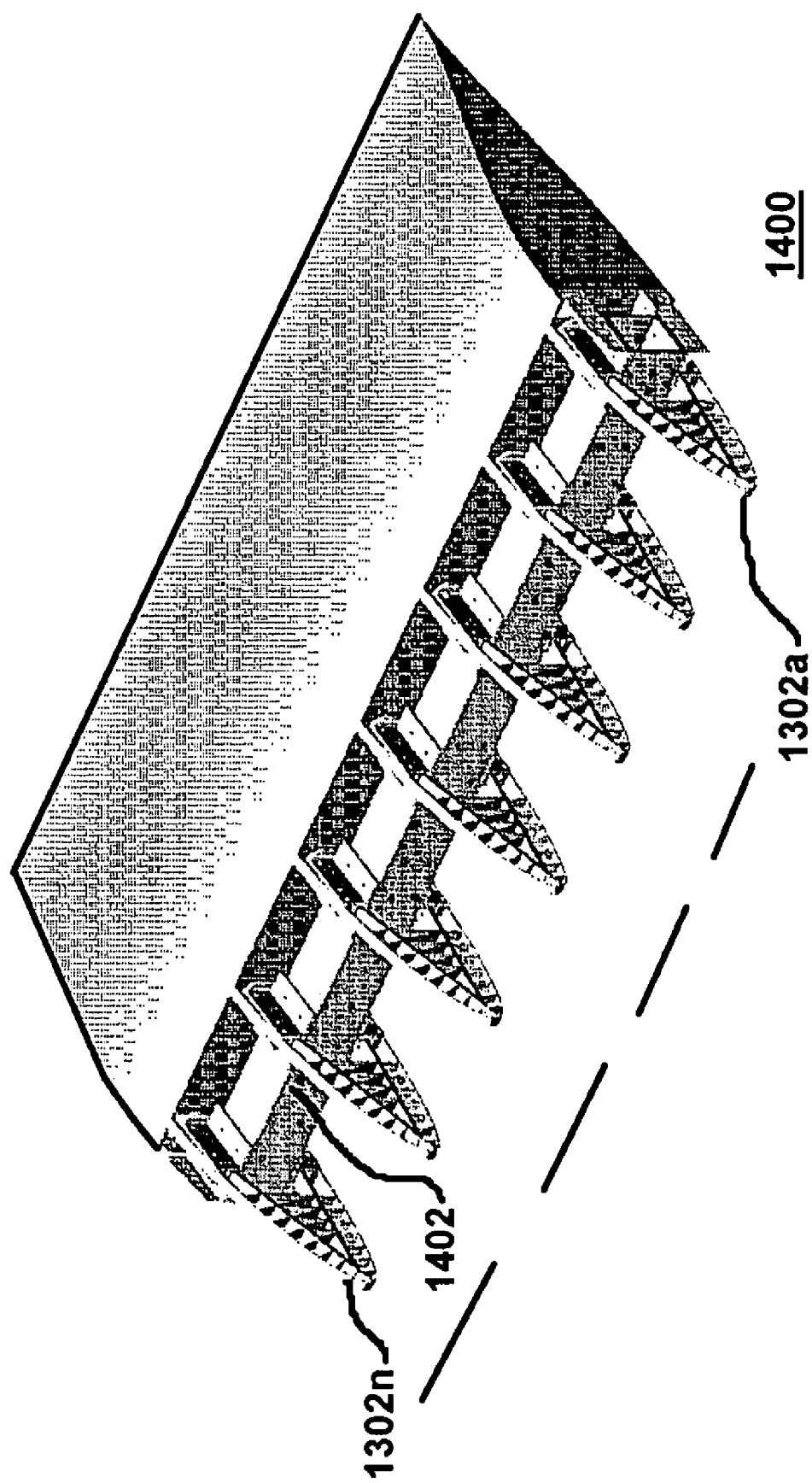
FIG. 14 is a simplified schematic representation that illustrates a plurality of the prototype compliant systems of FIG. 13 arranged in sequence along the forward portion of an airfoil.

FIG. 14 is a simplified schematic representation that illustrates a plurality of the prototype compliant systems of FIG. 13 arranged in sequence along the forward portion of an airfoil 1400. Compliant mechanisms 1302a through 1302n are shown to be coupled to a common drive tube 1402, such that all of them are subjected to a substantially identical input force.

Figure 15:
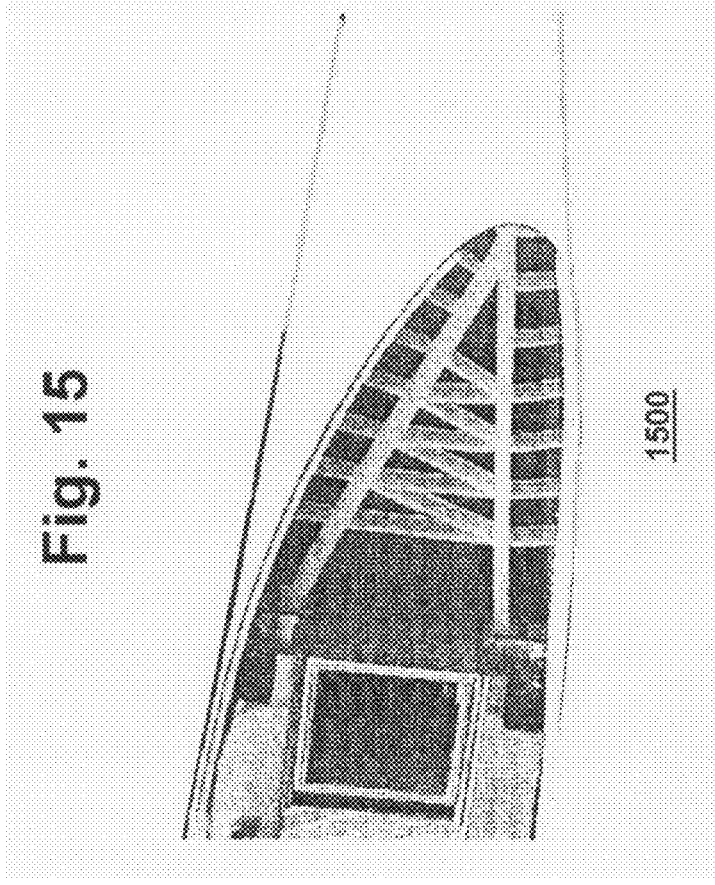
FIG. 15 is a perspective representation of an adaptive compliant wing constructed in accordance with the principles of the invention, the camber thereof being at 0°.

FIG. 15 is a perspective representation of an adaptive compliant wing 1500 constructed in accordance with the principles of the invention, the camber thereof being at 0°.

Figure 16:
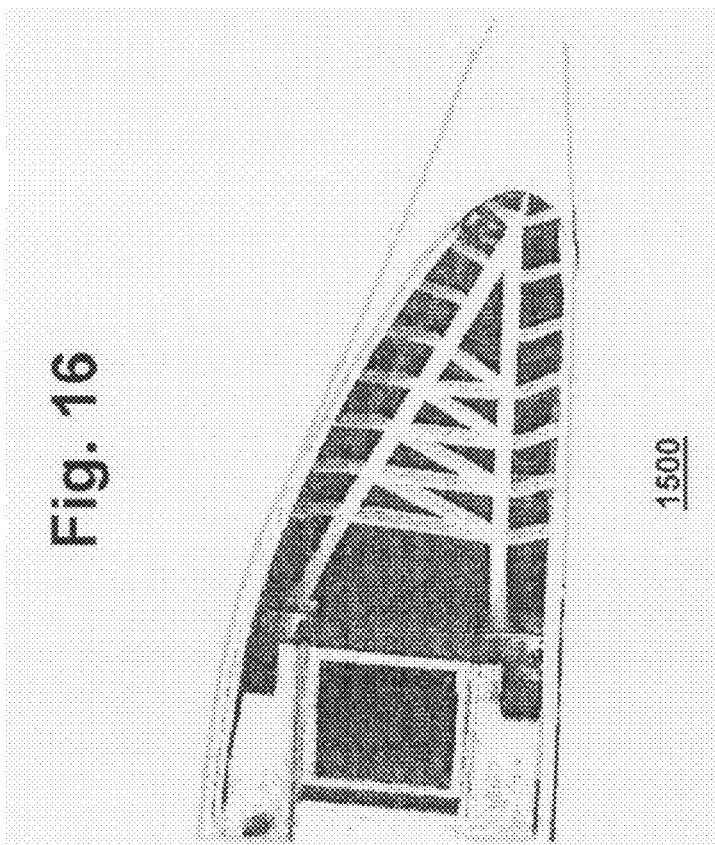
FIG. 16 is a perspective representation of the adaptive compliant wing of FIG. 15, the camber thereof being at 6°.

FIG. 16 is a perspective representation of the adaptive compliant wing 1500 of FIG. 15, the camber thereof being at 6°.

Figure 17:
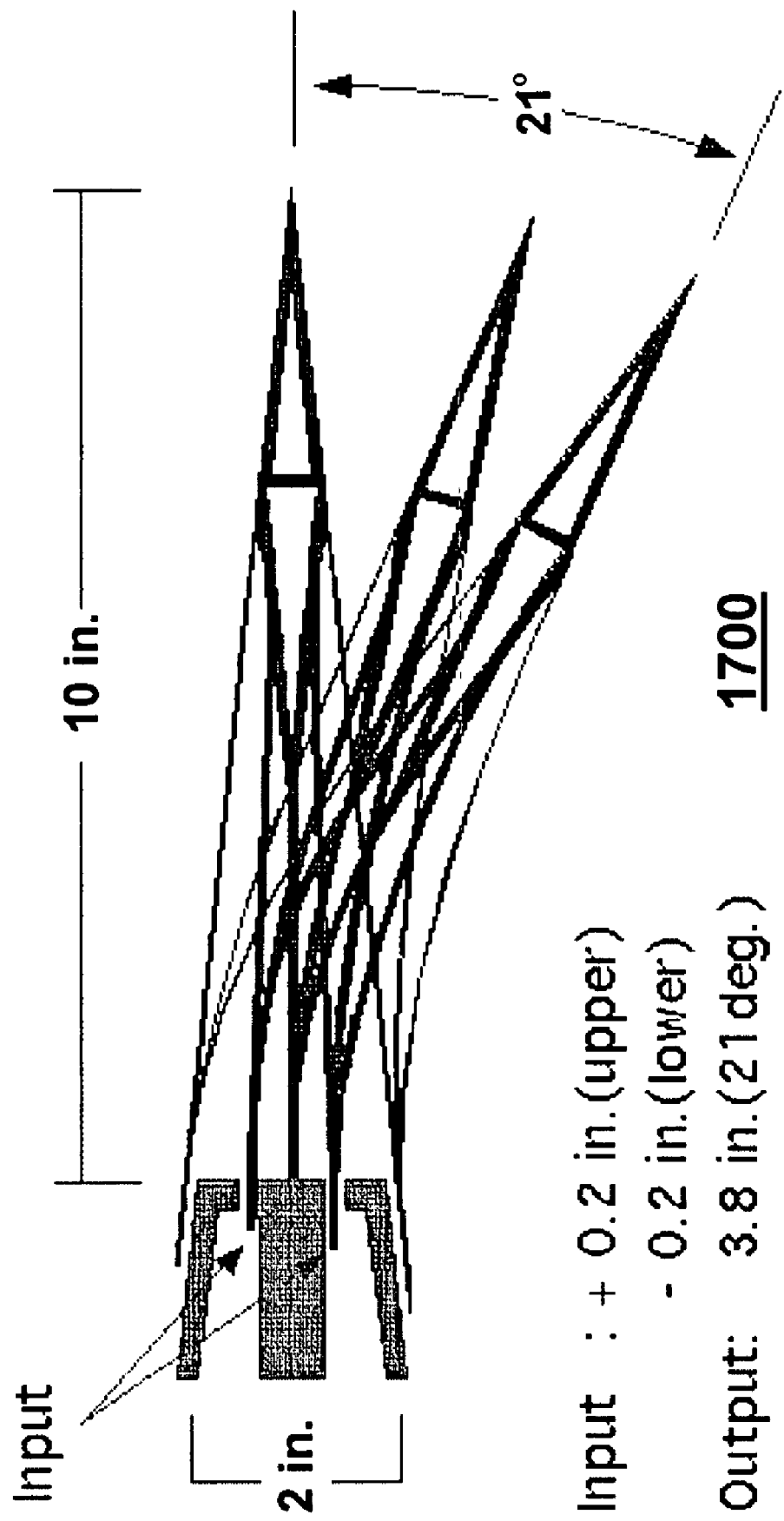
FIG. 17 is a simplified schematic representation of a compliant mechanism that is suitable for use as a trailing edge flap for an airfoil, and that exhibits an angular translation of 21°, corresponding to a distance of 3.8 inches, in response to an input of +0.2 inches at an upper input point, and an input of −0.2 inches at a lower input point.

FIG. 17 is a simplified schematic representation of a compliant trailing edge mechanism 1700 that is suitable for use as a trailing edge flap for an airfoil (not shown in this figure), and that exhibits an angular translation of 21°, corresponding to a distance of 3.8 inches, in response to an input of +0.2 inches at an upper input point, and an input of −0.2 inches at a lower input point. The compliant mechanism in this embodiment is approximately 10 inches in length and has a thickness of about 2 inches. Of course, a similar arrangement can be configured for use by water craft as a fin, a trim tab, or the like.

Figure 18:
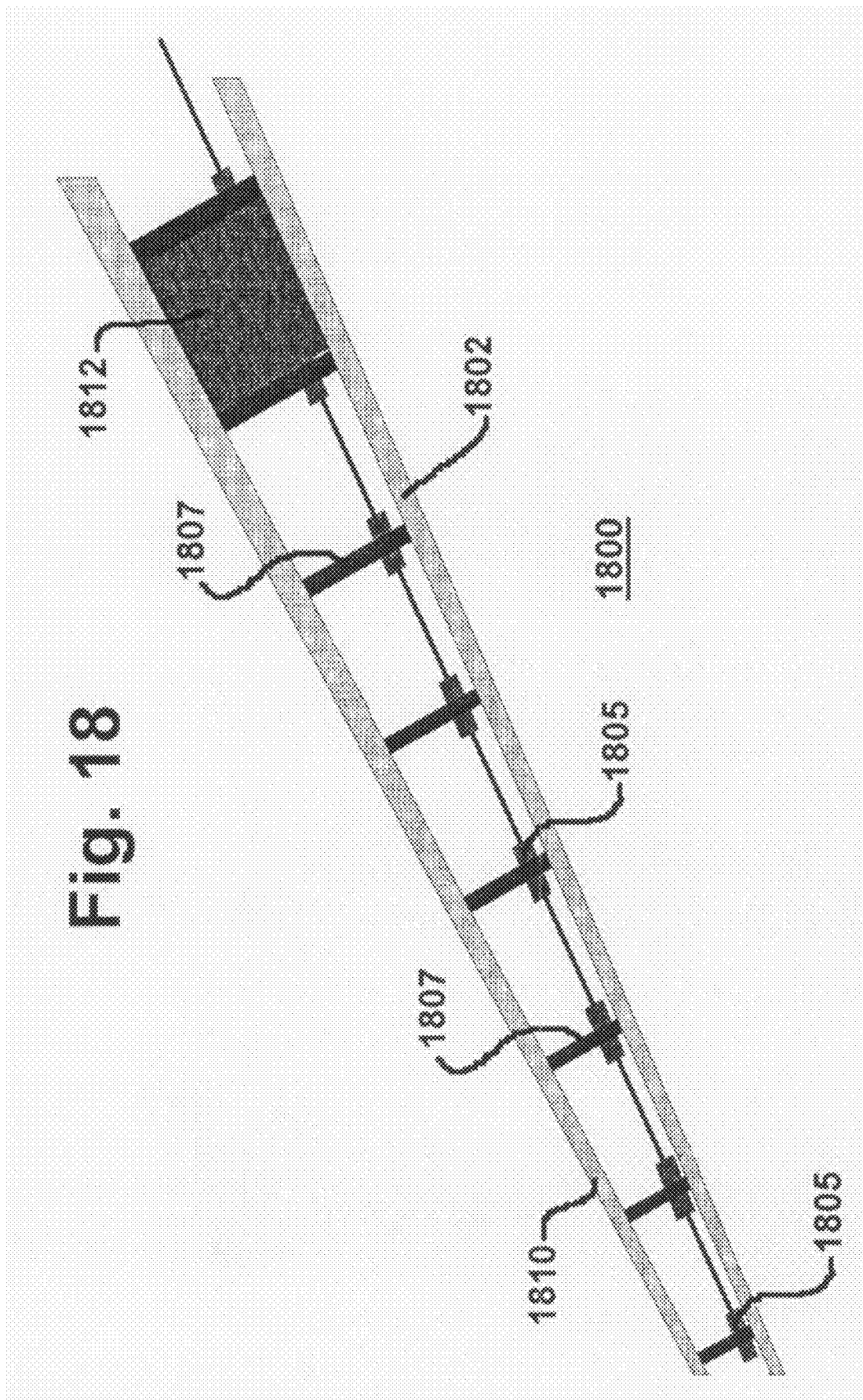
FIG. 18 is a simplified schematic representation of a compliant mechanism that is suitable for use as a leading edge flap for an airfoil useful in a high performance aircraft, such as a jet fighter.

FIG. 18 is a simplified schematic representation of a compliant mechanism 1800 that is suitable for use as a leading edge flap for an airfoil (not shown in this figure) useful in a high performance aircraft, such as a jet fighter (not shown). Compliant mechanism 1800 is shown to be formed of a main spar 1802 with an actuation mechanism 1805 that operates on compliant ribs (linkage elements) 1807. The compliant ribs are coupled on their respective ends to main spar 1802 and a leading edge spar 1810. In this embodiment, a composite material 1812 is inserted between certain ones of the compliant ribs.

In accordance with this specific illustrative embodiment of the invention, the compliant structure design is configured to achieve the following performance specifications:

| | |
|---|---|
| Flap range of motion | 0 degrees to +15 degrees (stream wise) |
| Compliant structures target shapes error | <1-2% (DV/V) |
| Space requirement | Same as F16 system |
| Max torque of inboard hydraulic rotary actuator | <100,000 in-lb |
| Operational temperature range | 275 degrees F. |
| Minimum factor of safety | 1.5 times ultimate loading |
| HP of actuation system | minimize power required |
| Approximate weight of flap + rotary drive system | minimize weight |

Figure 19B:
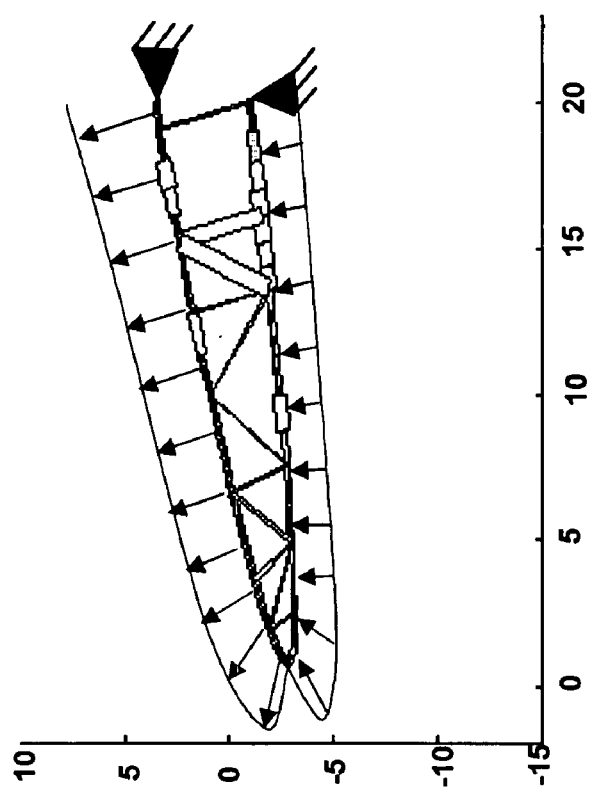
FIGS. 19a and 19b are simplified schematic representations of the compliant structure of the present invention presented to describe measures of performance, e.g., stiffness-to-compliance ratio.
Figure 19A:
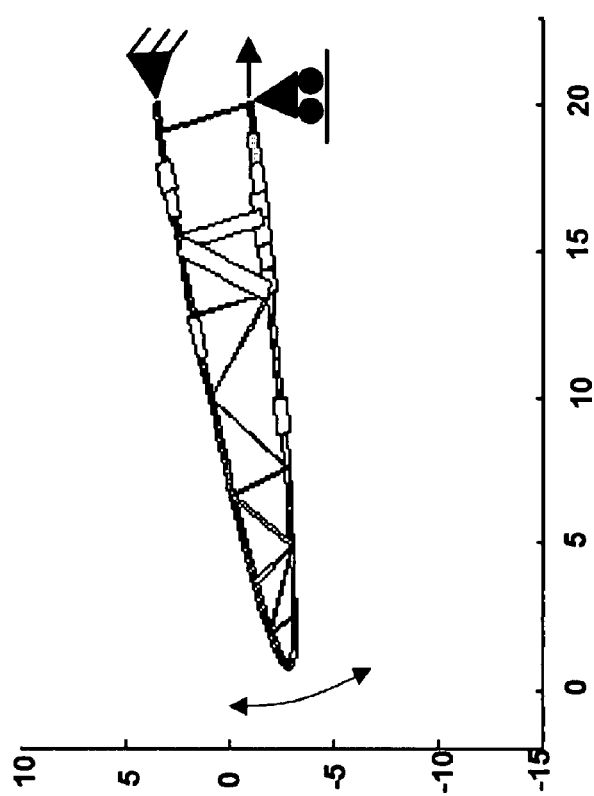

FIGS. 19a and 19b are simplified schematic representations of the compliant structure of the present invention presented to describe measures of performance, e.g., stiffness-to-compliance ratio. In this specific illustrative embodiment of the invention, the stiffness-to-compliance ratio is determined by comparing a measurement of applied pressure load while the actuator is fixed against a reaction force produced when the actuator is permitted to move. In this case, the stiffness-to-compliance ratio is 400.8.

$$\frac{K_{fixed}}{K_{flex}} = \frac{5.11E6 \text{ in-lb/rad}}{1.24E4 \text{ in-lb/rad}} = 400.8$$

Figure 20:
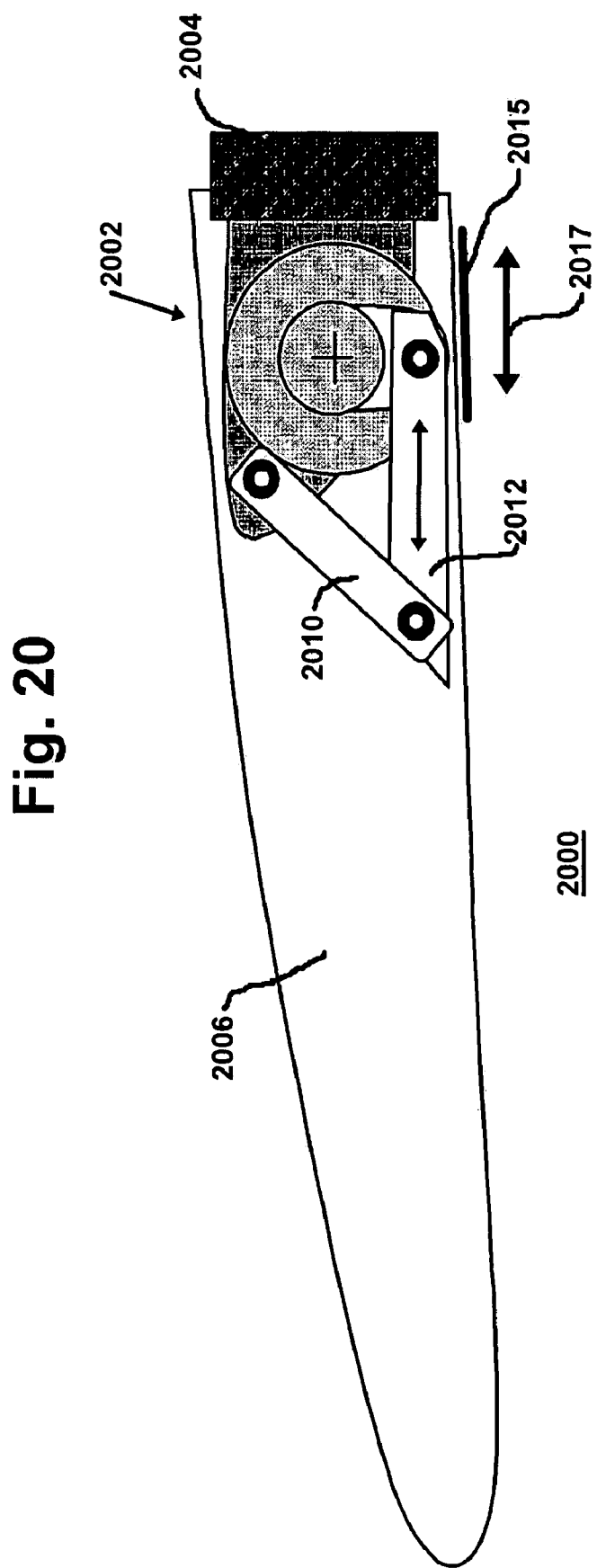
FIG. 20 is a simplified schematic representation that depicts an illustrative linkage that may, in certain embodiments, be used in conjunction with a rotary actuator.

FIG. 20 is a simplified schematic representation that depicts an illustrative linkage that may, in certain embodiments, be used in conjunction with a rotary actuator 2002. The rotary actuator is coupled at one end thereof to a main spar 2004 and to compliant structure 2006 by a drive linkage arrangement that is formed of links 2010 and 2012. In operation, rotary actuator 2002 urges ling 2012 to move in the direction of the two-headed arrow thereon. There is additionally provided a sliding/stretching joint 2015 that accommodates the movement of the wing skin (not specifically designated) in the direction of two-headed arrow 2017.

Figure 21:
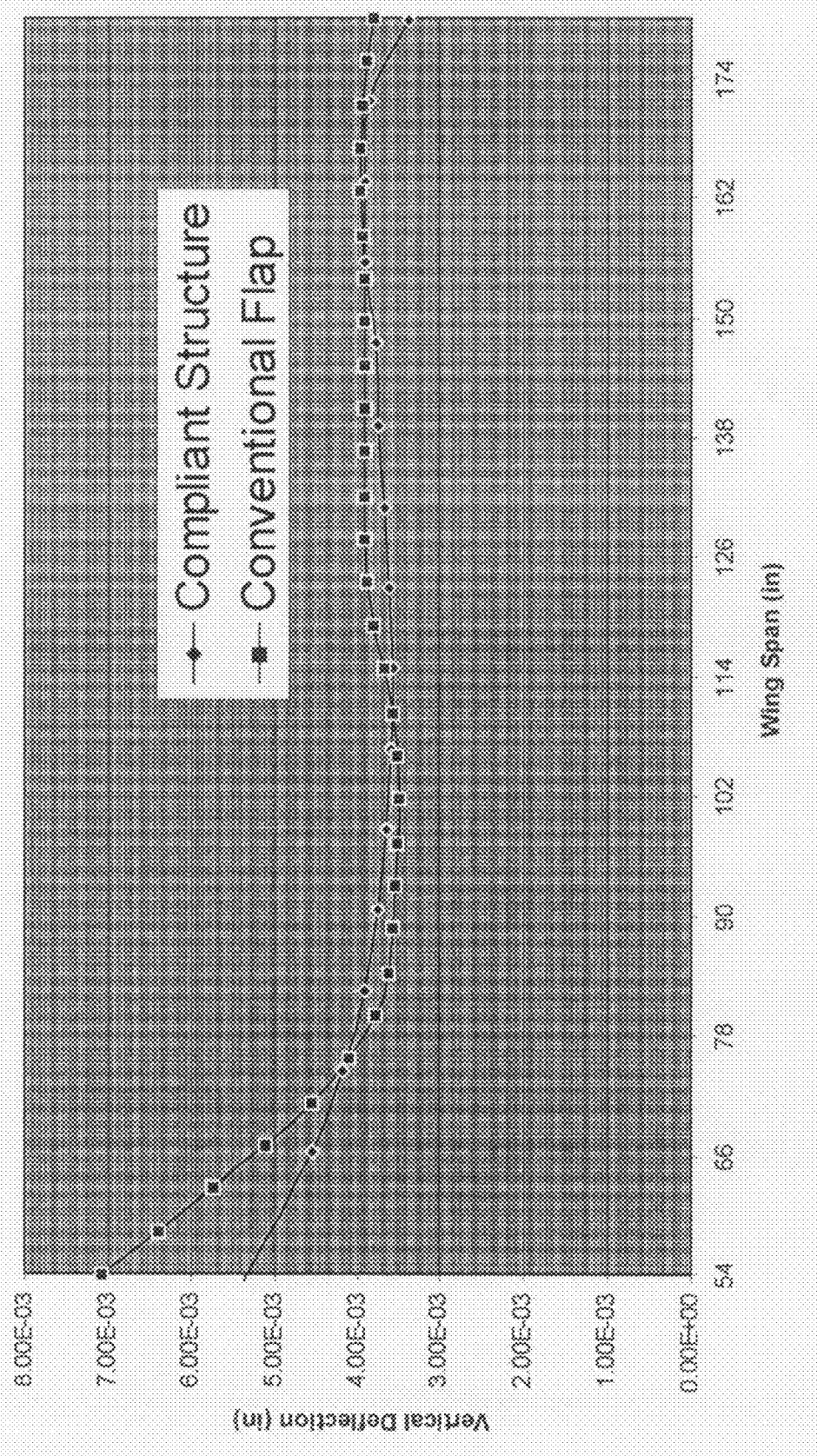
FIG. 21 is a graphical illustration that correlates vertical deflection of a leading edge against wingspan for the compliant structure and a conventional flap.

FIG. 21 is a graphical illustration that correlates vertical deflection of a leading edge against wingspan for the compliant structure of the present invention and a conventional flap.

Figure 22A:
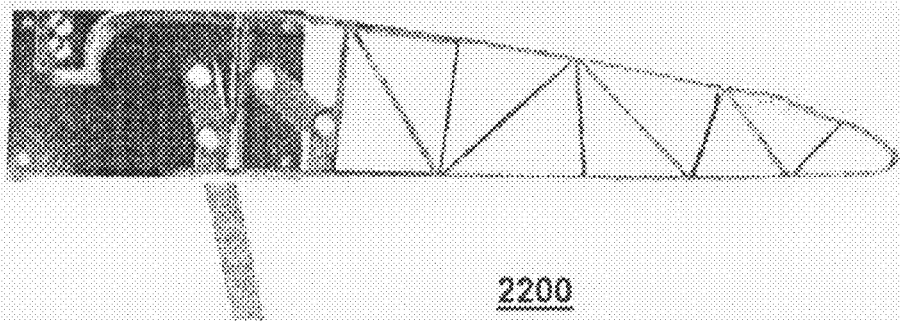
FIGS. 22a, 22b, and 22c constitute a sequence of three representations of a leading edge compliant structure in various degrees of camber, from 0° to 15°.
Figure 22B:
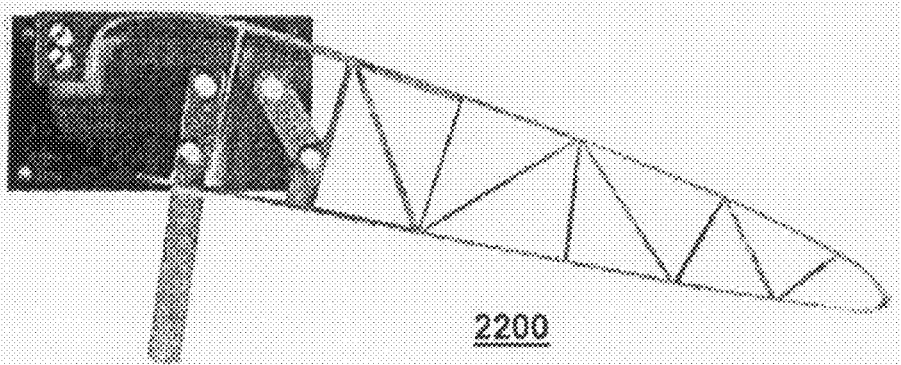
Figure 22C:
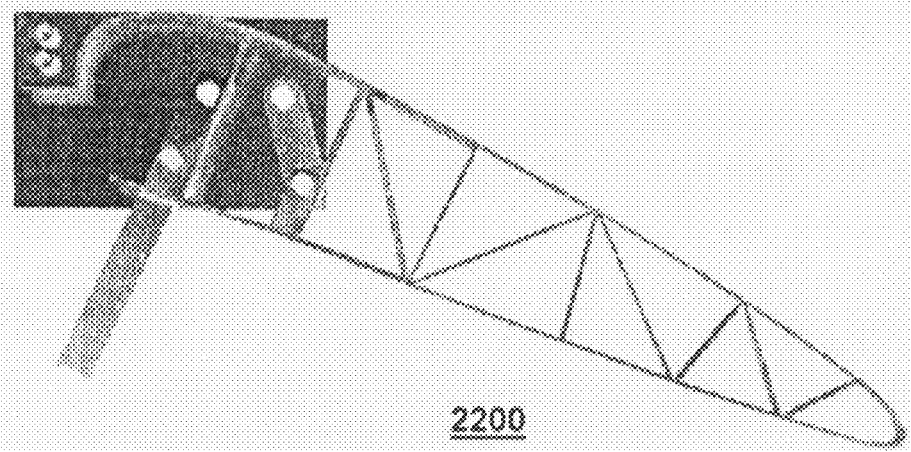

FIGS. 22a, 22b, and 22c constitute a sequence of three representations of a mock up leading edge compliant structure 2200 in various degrees of camber, from 0° to 15°. Leading edge compliant structure 2200 is formed of metal, as previously discussed, and is provided with a manual actuation arrangement to show the relationship between the actuation and the resulting angular (camber) change of the leading edge compliant structure.

FIG. 23 illustrates a compliant structure arrangement 2300 actuated by a lever arm 2302. The location of actuation 2305 is at the terminus of lever arm 2302, and the application of a torque by torque tube 2310 causes compliant portion 2312 to be deflected in the direction of two-headed arrow 2314.

FIG. 24 illustrates a compliant structure 2400 that is actuated by a torque tube 2410. The forces applied in the directions of arrows 2402 and 2404 cause compliant portion 2412 be deflected in the direction of two-headed arrow 2414.

Figure 25:
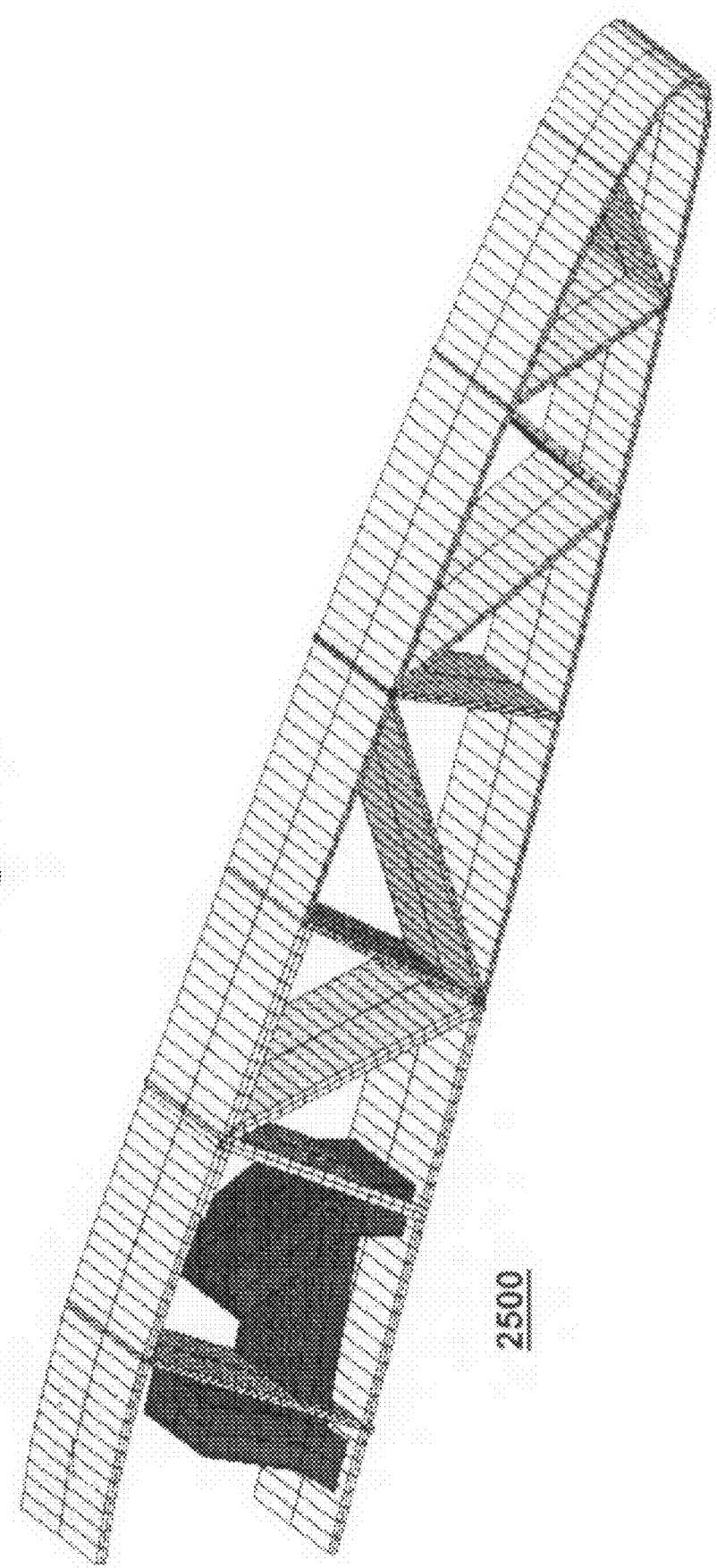
FIG. 25 is an isometric representation of a compliant structure formed of Titanium Ti-6Al-4V.

FIG. 25 is an isometric representation of a compliant structure 2500 formed of Titanium Ti-6Al-4V. Selection of the material is determined by maximization of the elastic energy stored per unit weight. Thus, it is desired to maximize $S_y^2/\rho E$, where $S_y$ is the yield strength, $\rho$ is the density, and E is the elastic modulus. Consideration is also to be given to fatigue strength. The characteristics of some of the materials that are useful in the practice of the invention are as follows:

| Material | $S_y$ Mpa | $\rho$ g/cc | E Gpa | $S_y/\rho E$ × $10^{-3}$ | $S_y^2/\rho E$ |
|---|---|---|---|---|---|
| Aluminum 7075-T6 | 505 | 2.81 | 72 | 2.5 | 1260 |
| Al-Lithium 1460 | 620 | 2.59 | 72 | 3.3 | 2060 |
| Titanium Ti—6Al—4V | 880 | 4.43 | 114 | 1.74 | 1533 |
| Titanium 8Al—1Mo—1V | 1070 | 4.37 | 120 | 2.0 | 2183 |
| Maraging Steel (18Ni) Not available in plate form | 2135 | 8 | 190 | 1.4 | 3000 |
| MMC Al alloy | 1300 | 3.5 | 300 | 1.2 | 1609 |

Figure 26:
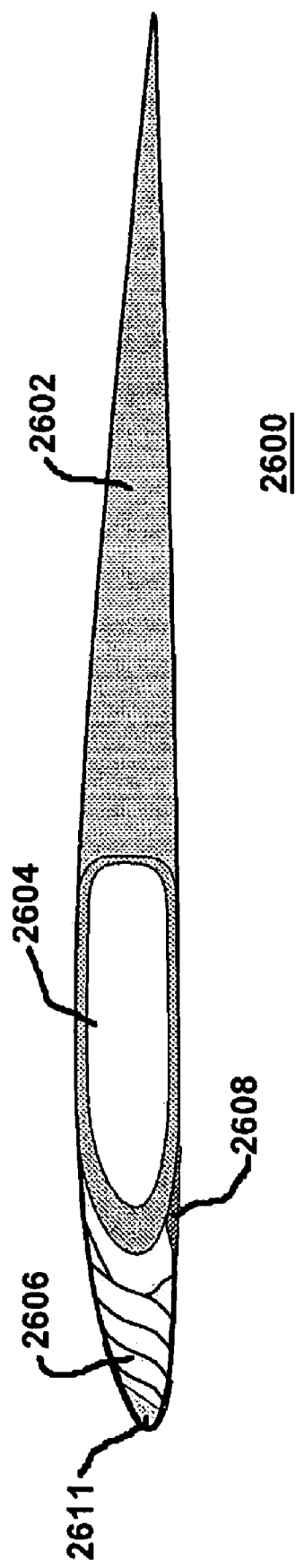
FIGS. 26 and 27 are simplified schematic representations of a helicopter rotor employing the present invention.
Figure 27:
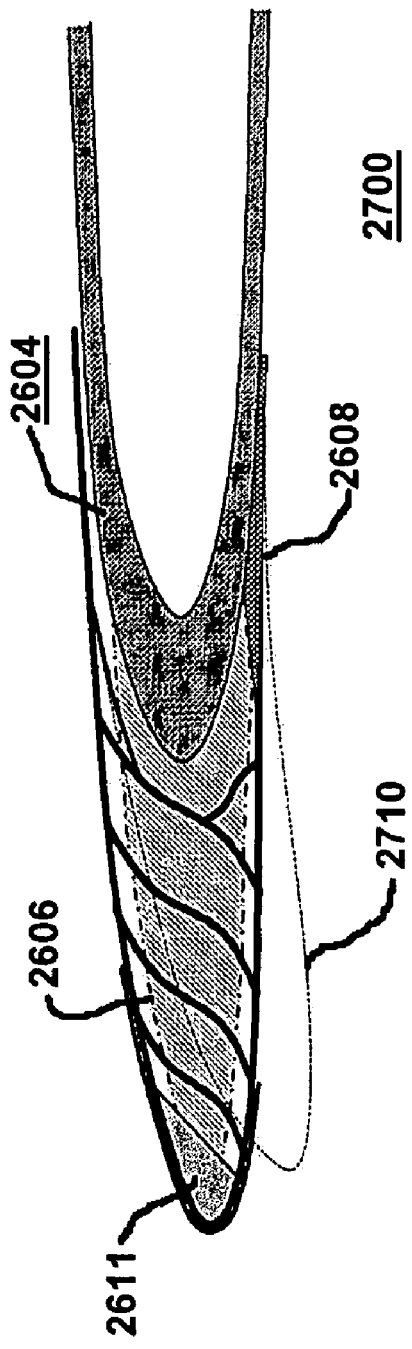

FIGS. 26 and 27 are simplified schematic representations of helicopter rotors employing the present invention. As previously noted, a contour that is varied over the angular displacement of the rotor is applicable to aquatic vehicles, such as submarine propellers, where variation in the thrust exerted over respective portions of the path of angular displacement can provide desirable diminution in turning radius, as well as descent and ascent characteristics.

In FIG. 26, a rotor blade 2600 is shown schematically and cross-sectionally to have a honeycomb trailing edge 2602 coupled to a D-spar 2604. Forward of the D-spar is a compliant structure 2606 that is coupled to the D-spar and is sealed thereto by an elastomeric seal 2608. there is additionally shown a wear strip 2611 that will accommodate wear, particularly when the helicopter is used in an abrasive environment.

FIG. 27 shows a forward portion 2700 of a helicopter rotor (not shown in this figure) and illustrates that actuation of compliant structure 2606 results in a leading edge deformation illustrated by position 2710.

Although the invention has been described in terms of specific embodiments and applications, persons skilled in the art can, in light of this teaching, generate additional embodiments without exceeding the scope or departing from the spirit of the invention claimed herein. Accordingly, it is to be understood that the drawing and description in this disclosure are proffered to facilitate comprehension of the invention, and should not be construed to limit the scope thereof.

What is claimed is:

1. An arrangement for producing a variation in the contour of a compliant surface, the arrangement comprising:
   a compliant frame having,
      a first resiliently variable frame element having a corresponding first outer surface and a first inner surface, and
      a second resiliently variable frame element having a corresponding second outer surface and a second inner surface,
      the first outer surface being arranged in substantially distal opposition to the second outer surface and in communication with the compliant surface, wherein the variation in the contour of the compliant surface is responsive to variation in the contour of the first outer surface of said compliant frame;
   a linkage element having a predetermined resilience characteristic and being resiliently coupled at a first end thereof to the first inner surface and at a second end thereof to the second inner surface; and
   an actuator for applying a force to the second resiliently variable frame element with respect to a support element, whereby application of the force by said actuator results in a corresponding variation in the contour of the compliant surface.

2. The arrangement of claim 1, wherein there is further provided a frame coupler for coupling the first resiliently variable frame element to a support element.

3. The arrangement of claim 1, wherein there is further provided a second linkage element formed of a first material having a second predetermined resilience characteristic and being coupled at a first end thereof to the first inner surface and at a second end thereof to the second inner surface.

4. The arrangement of claim 3, wherein said first and second linkage elements are formed of materials that have substantially identical resilience characteristics.

5. The arrangement of claim 3, wherein said first and second linkage elements are longitudinal in configuration and arranged substantially parallel to each other.

6. The arrangement of claim 1, wherein said first and second resiliently variable frame elements are coupled to each other at a portion thereof distal from the support element.

7. The arrangement of claim 1, wherein the support element is a spar of a wing of an aircraft.

8. The arrangement of claim 1, wherein said first and second resiliently variable frame elements have respective first and second resilience characteristics.

9. The arrangement of claim 1, wherein said actuator is arranged to exert a substantially longitudinal force.

10. The arrangement of claim 9, wherein said actuator is arranged to exert a torque.

11. The arrangement of claim 10, wherein said actuator is arranged to convert the torque to a substantially longitudinal force.

12. The arrangement of claim 1, wherein the compliant surfaces is a surface of a wing of a fixed wing aircraft.

13. The arrangement of claim 1, wherein the compliant surface is a surface of a rotatory wing of a helicopter.

14. The arrangement of claim 1, wherein the compliant surface is a surface of an impeller of a water craft.

15. The arrangement of claim 1, wherein the compliant surface is a surface of a keel of a water craft.

16. An arrangement for producing a variation in the contours of a first compliant surface, the arrangement comprising:
   a first compliant frame having,
      a respective first resiliently variable frame element having a corresponding first outer surface and a first inner surface, and
      a respective second resiliently variable frame element having a corresponding second outer surface and a second inner surface,
      the respective first and second outer surfaces being arranged in substantially distal opposition to one another and in communication with respectively associated ones of the first and second compliant surfaces, wherein the variation in the contours of the first and second compliant surfaces are responsive to variation in the contours of the first and second outer surfaces of said first compliant frame;
   a second compliant frame having,
      a respective first resiliently variable frame element having a corresponding first outer surface and a first inner surface, and
      a respective second resiliently variable frame element having a corresponding second outer surface and a second inner surface,
      the respective tint and second outer surfaces being arranged in substantially distal opposition to one another and in communication with respectively associated ones of the first and second compliant surfaces, wherein the variation in the contours of the first and second compliant surfaces are responsive to variation in the contours of the first and second outer surfaces of said second compliant frame;
   a first linkage element having a predetermined resilience characteristic and being coupled resiliently at a first end thereof to the first inner surface and resiliently at a second end thereof to the second inner surface, of said first compliant frame;
   a second linkage element having a predetermined resilience characteristic and being coupled resiliently at a first end thereof to the first inner surface and resiliently at a second end thereof to the second inner surface, of said second compliant frame;
   a first frame coupler for coupling the first resiliently variable frame element of the first compliant flame to a support element;
   a second frame coupler for coupling the first resiliently variable frame element of the second compliant frame to a support element;
   a drive element coupled to the second resiliently variable frame element of each of the first and second compliant frames; and
   an actuator for applying a force to said drive element with respect to the support element, whereby application of the force by said actuator results in a corresponding variation in the contour of the first compliant surfaces of the first and second compliant frames.

17. The arrangement of claim 16, wherein said actuator comprises a power take off arrangement associated with a rotary wing of a rotary wing aircraft that provides a force that varies in response to the angular position of the rotary wing.

18. The arrangement of claim 16, wherein said actuator is arranged to convert a torque to a linear force.

19. The arrangement of claim 16, wherein said first and second compliant frames are arranged in side-by-side relation to each other, and the first compliant surface is arranged to overlie the first outer surface of each of said first and second compliant frames.

20. The arrangement of claim 19, wherein there is further provided a resilient filler material disposed intermediate of said first and second compliant frames.

21. The arrangement of claim 19, wherein there is provided a second compliant surface arranged to overlie the second outer surface of each of said first and second compliant frames.

22. The arrangement of claim 16, wherein said first and second compliant frames are arranged in mirror image relation to each other whereby the respective second resiliently variable frame elements of said first and second compliant frames communicate with each other.

23. An arrangement for producing a variation in she contours of first and second compliant surfaces, the arrangement comprising:
   a compliant frame having,
      a first resiliently variable frame element having a corresponding first outer surface and a first inner surface, and
      a second resiliently variable frame element having a corresponding second outer surface and a second inner surface, the first and second outer surfaces being arranged in substantially distal opposition so one another and in communication with respectively associated ones of the first and second compliant surfaces, wherein the variation in the contours of the first and second compliant surfaces are responsive to variation in the contours of the first and second outer, surfaces of said compliant frame;

a linkage element having a predetermined resilience characteristic and being resiliently coupled at a first end thereof to the first inner surface and resiliently at a second end thereof to the second inner surface;

a frame coupler for coupling the first resiliently variable frame element so a support element; and an actuator for applying a force to the second resiliently variable frame element wish respect so the support element, whereby application of the force by said actuator results in a corresponding variation in the contour of the first and second compliant surfaces.

* * * * *